(12) United States Patent
Horiuchi

(10) Patent No.: US 11,949,565 B2
(45) Date of Patent: Apr. 2, 2024

(54) SYSTEM, APPARATUS, AND ASSOCIATED METHODOLOGY FOR RESTRICTING COMMUNICATION BANDWIDTHS FOR COMMUNICATIONS THROUGH A RELAY DEVICE

(71) Applicant: Takeshi Horiuchi, Tokyo (JP)

(72) Inventor: Takeshi Horiuchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/965,876

(22) Filed: Oct. 14, 2022

(65) Prior Publication Data
US 2023/0171159 A1 Jun. 1, 2023

(30) Foreign Application Priority Data
Nov. 30, 2021 (JP) ................................. 2021-195000

(51) Int. Cl.
*H04L 65/1108* (2022.01)
*H04L 41/0896* (2022.01)

(52) U.S. Cl.
CPC ...... *H04L 41/0896* (2013.01); *H04L 65/1108* (2022.05)

(58) Field of Classification Search
CPC ............. H04L 41/0896; H04L 41/0897; H04L 65/1108; H04L 65/403
USPC ........................................................ 709/226
See application file for complete search history.

(56) References Cited

U.S. PATENT DOCUMENTS

| 2014/0241215 | A1* | 8/2014 | Massover | ........... H04L 12/1845 |
| | | | | 370/260 |
| 2016/0191461 | A1* | 6/2016 | Wang | .................. H04L 61/2589 |
| | | | | 709/227 |
| 2017/0078456 | A1* | 3/2017 | Navare | ................. H04L 65/765 |
| 2017/0346741 | A1* | 11/2017 | Chatterjee | ........... H04L 41/0896 |

(Continued)

FOREIGN PATENT DOCUMENTS

| JP | 2014-099160 | 5/2014 |
| JP | 2016-512667 | 4/2016 |

(Continued)

OTHER PUBLICATIONS

U.S. Appl. No. 17/831,462, filed Jun. 3, 2022, Hidekuni Annaka, et al.

(Continued)

*Primary Examiner* — Hee Soo Kim
(74) *Attorney, Agent, or Firm* — XSENSUS LLP

(57) ABSTRACT

A communication management apparatus includes circuitry that manages first communication in which a terminal apparatus transmits content data to another terminal apparatus via a relay apparatus. The circuitry receives, from the terminal apparatus, a determination of whether the terminal apparatus is communicable with the another terminal apparatus through second communication that bypasses the relay apparatus. Based on a determination that the terminal apparatus is communicable with the another terminal apparatus through the second communication, the circuitry restricts a communication bandwidth for the first communication of the another terminal apparatus determined to be communicable with the terminal apparatus through the second communication.

17 Claims, 12 Drawing Sheets

(56) References Cited

U.S. PATENT DOCUMENTS

| | | |
|---|---|---|
| 2018/0097682 A1 | 4/2018 | Yoshida et al. |
| 2018/0098105 A1 | 4/2018 | Morita et al. |
| 2018/0191787 A1 | 7/2018 | Morita et al. |
| 2018/0227457 A1 | 8/2018 | Morita et al. |
| 2019/0082144 A1 | 3/2019 | Hakata et al. |
| 2019/0098211 A1 | 3/2019 | Ohmura et al. |
| 2019/0098253 A1 | 3/2019 | Soneda et al. |
| 2019/0191198 A1 | 6/2019 | Morita et al. |
| 2019/0306004 A1 | 10/2019 | Hakata et al. |
| 2019/0306201 A1 | 10/2019 | Ohmura et al. |
| 2019/0306421 A1 | 10/2019 | Takeda et al. |
| 2019/0306458 A1 | 10/2019 | Soneda et al. |
| 2020/0045230 A1 | 2/2020 | Ohmura et al. |
| 2020/0045244 A1 | 2/2020 | Ohmura et al. |
| 2020/0186407 A1 | 6/2020 | Morita et al. |
| 2020/0228579 A1* | 7/2020 | Ivov ................ H04L 65/403 |
| 2020/0244510 A1 | 7/2020 | Hakata et al. |
| 2020/0274904 A1 | 8/2020 | Ohmura et al. |
| 2020/0296284 A1 | 9/2020 | Aikawa et al. |
| 2020/0296302 A1 | 9/2020 | Shiro et al. |
| 2020/0382700 A1 | 12/2020 | Takatsu et al. |
| 2021/0026589 A1 | 1/2021 | Morita et al. |
| 2021/0090211 A1 | 3/2021 | Takeda et al. |
| 2021/0099669 A1 | 4/2021 | Shiro et al. |
| 2022/0070412 A1 | 3/2022 | Aikawa et al. |
| 2022/0094850 A1 | 3/2022 | Morita et al. |
| 2022/0103751 A1 | 3/2022 | Annaka et al. |
| 2022/0103763 A1 | 3/2022 | Annaka et al. |
| 2022/0309133 A1 | 9/2022 | Hiroshi et al. |
| 2022/0311970 A1 | 9/2022 | Morita et al. |

FOREIGN PATENT DOCUMENTS

| | | | |
|---|---|---|---|
| JP | 2018-503886 | 2/2018 | |
| JP | 2020-039140 | 3/2020 | |
| JP | 2020-528189 | 9/2020 | |
| JP | 2020-174396 | 10/2020 | |
| JP | 2021-039616 | 3/2021 | |
| WO | WO2014/123738 A1 | 8/2014 | |
| WO | WO2015/038997 A1 | 3/2015 | |
| WO | WO-2016048664 A1 * | 3/2016 | ......... H04L 65/1006 |
| WO | WO2016/064520 A1 | 4/2016 | |
| WO | WO2016/103051 A1 | 6/2016 | |
| WO | WO2018/084033 A1 | 5/2018 | |
| WO | WO2019/018716 A1 | 1/2019 | |

OTHER PUBLICATIONS

U.S. Appl. No. 17/841,677, filed Jun. 16, 2022, Mayu Hakata, et al.

* cited by examiner

| ID | AVAILABLE ROOM ID | TERMINAL TYPE | PASSWORD |
|---|---|---|---|
| B0001 | Room1, Room2, Room3 | TRANSMITTER TERMINAL | aaaa |
| B0002 | Room1, Room4, Room5 | RECEIVER TERMINAL | bbbb |
| B0003 | Room1 | REGULAR TERMINAL | cccc |

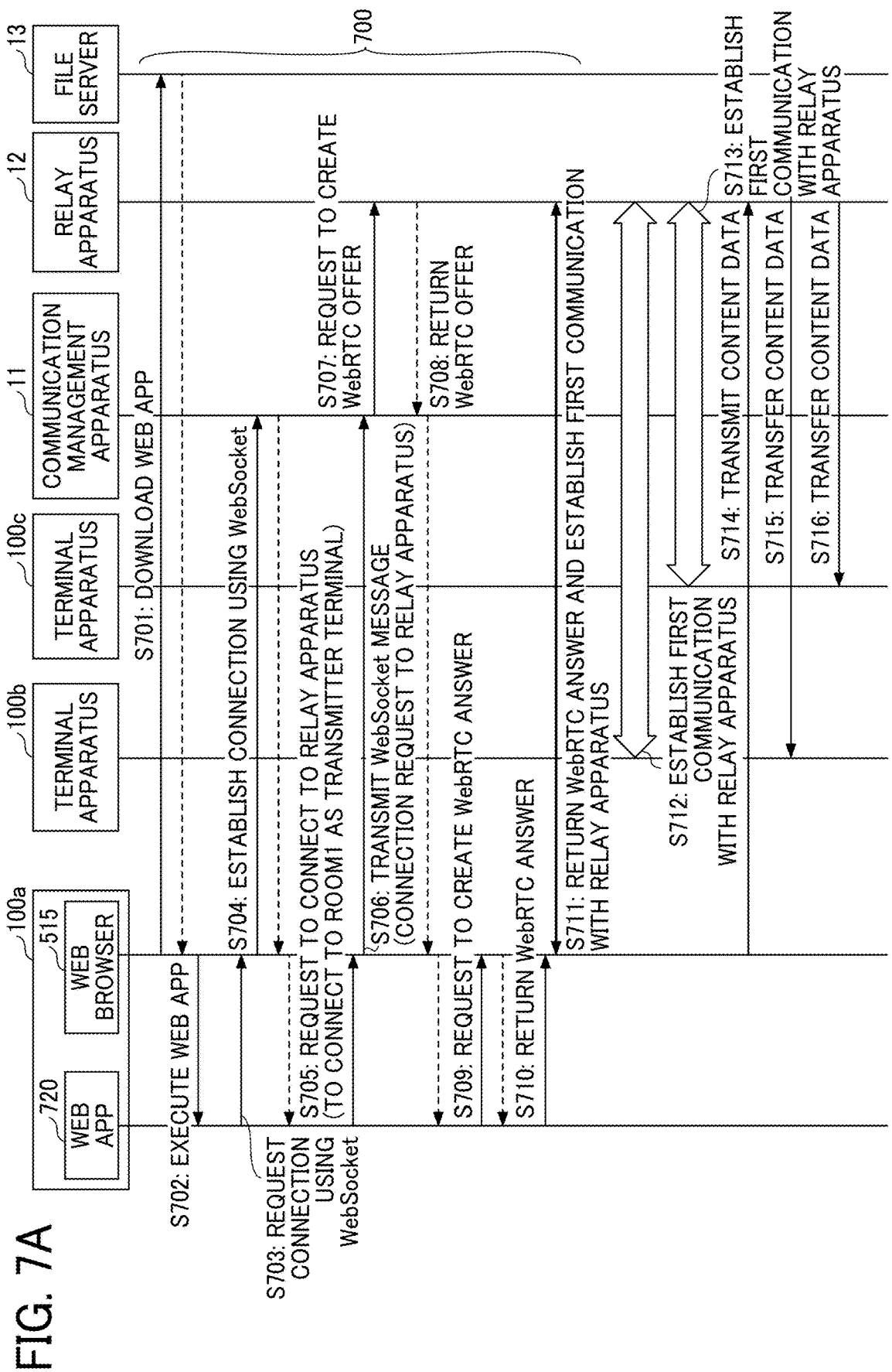

SYSTEM, APPARATUS, AND ASSOCIATED METHODOLOGY FOR RESTRICTING COMMUNICATION BANDWIDTHS FOR COMMUNICATIONS THROUGH A RELAY DEVICE

CROSS-REFERENCE TO RELATED APPLICATION

This patent application is based on and claims priority pursuant to 35 U.S.C. § 119(a) to Japanese Patent Application No. 2021-195000, filed on Nov. 30, 2021, in the Japan Patent Office, the entire disclosure of which is hereby incorporated by reference herein.

BACKGROUND

Technical Field

Embodiments of this disclosure relate to a communication management apparatus, a communication system, a communication management method, and a non-transitory recording medium.

Related Art

There is a widely used communication system in which a plurality of terminal apparatuses connected to a communication network transmit and receive content data such as image or audio data, for example, via a relay apparatus with an application programming interface (API) of a world wide web (Web) browser.

There is also a technique of commanding a router from a terminal apparatus to implement quality of service (QoS) on a Web client lacking the ability to support QoS.

The APIs executable on the Web browser are limited due to security or privacy issues, for example, preventing the acquisition of information of a data link layer or a neighbouring terminal apparatus, for instance. It is therefore difficult for the typical communication system, in which the content data is transmitted and received with the API of the Web browser, to optimize bandwidth control based on network topology information.

SUMMARY

In one embodiment of this invention, there is provided a communication management apparatus that includes, for example, circuitry that manages first communication in which a terminal apparatus transmits content data to another terminal apparatus via a relay apparatus. The circuitry receives, from the terminal apparatus, a determination of whether the terminal apparatus is communicable with the another terminal apparatus through second communication that bypasses the relay apparatus. Based on a determination that the terminal apparatus is communicable with the another terminal apparatus through the second communication, the circuitry restricts a communication bandwidth for the first communication of the another terminal apparatus determined to be communicable with the terminal apparatus through the second communication.

In one embodiment of this invention, there is provided a communication system that includes, for example, the above-described communication management apparatus and a terminal apparatus including terminal circuitry. The terminal circuitry performs first communication of transmitting content data to another terminal apparatus via a relay apparatus. The terminal circuitry transmits, to the communication management apparatus, a determination of whether the terminal apparatus is communicable with the another terminal apparatus through second communication that bypasses the relay apparatus. The terminal circuitry performs the second communication with the another terminal apparatus.

In one embodiment of this invention, there is provided a communication management method that includes, for example, managing first communication in which a terminal apparatus transmits content data to another terminal apparatus via a relay apparatus, receiving, from the terminal apparatus, a determination of whether the terminal apparatus is communicable with the another terminal apparatus through second communication that bypasses the relay apparatus, and based on a determination that the terminal apparatus is communicable with the another terminal apparatus through the second communication, restricting a communication bandwidth for the first communication of the another terminal apparatus determined to be communicable with the terminal apparatus through the second communication.

In one embodiment of this invention, there is provided a non-transitory recording medium which, when executed by one or more processors, causes the processors to perform the above-described communication management method.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 6 is a diagram illustrating an example of connection management information of the first embodiment;

FIG. 7A is a sequence diagram illustrating an example of a first communication process of the first embodiment;

Figure 1:
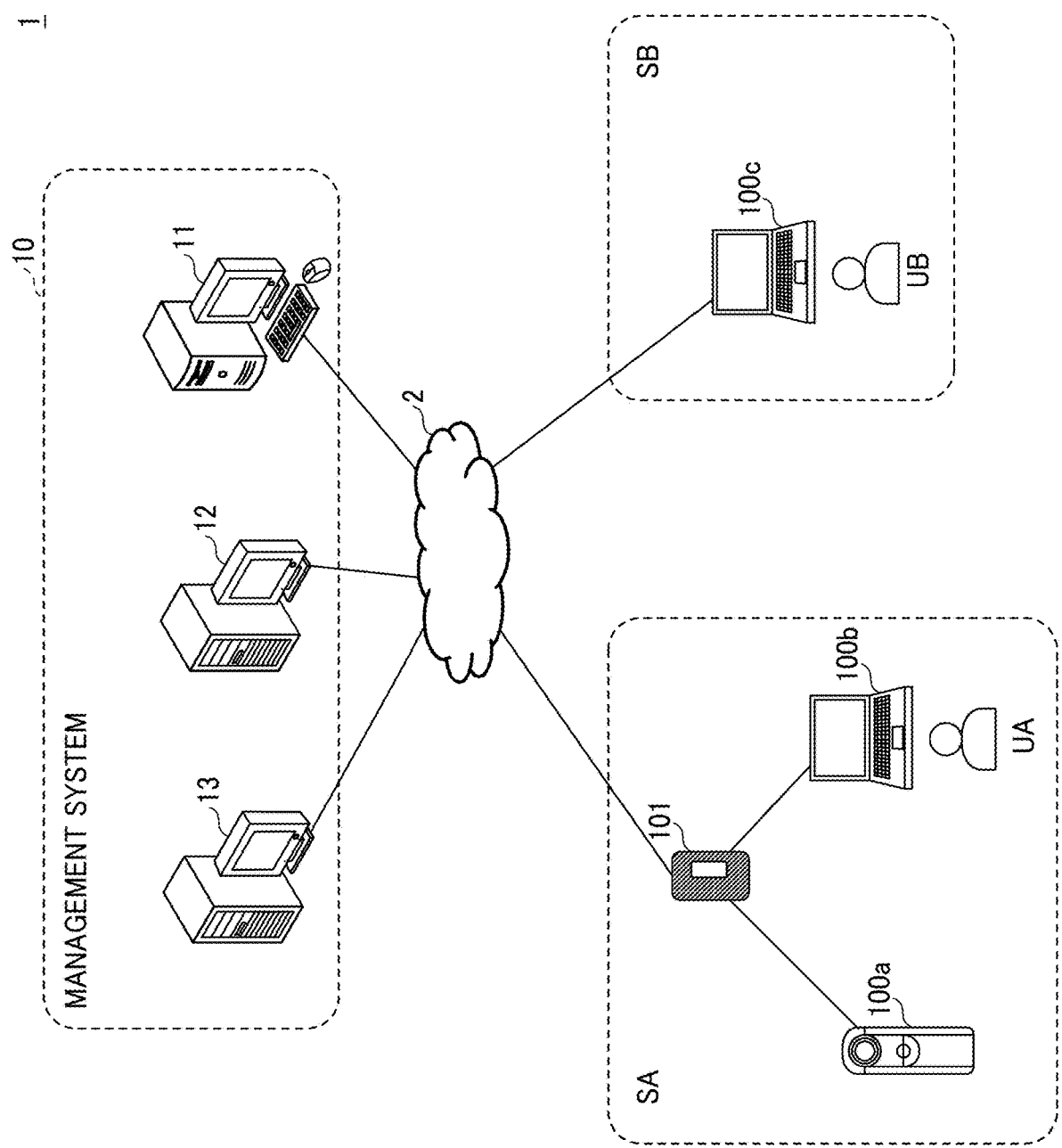
FIG. 1 is a diagram illustrating an example of the system configuration of a communication system according to a first embodiment of the present invention.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A system configuration of a communication system according to a first embodiment of the present invention will be described.

FIG. 1 is a diagram illustrating an example of the system configuration of a communication system 1 according to the first embodiment. In the communication system 1, a user UA at a site SA connects a terminal apparatus (image capturing device) 100a and a terminal apparatus (information terminal) 100b to a router 101 such as a mobile router to communicate with a terminal apparatus (information terminal) 100c at another site SB via a communication network 2. A user UB at the site SB participates in a particular event (e.g., a remote communication session) provided by a management system 10 to display, at the site SB, a captured image (e.g., video image) distributed from the remote site SA to view in real time the situation of the site SA, for example. Herein, the particular event includes, for example, video conference, distance education, telemedicine, and remote meeting, consultation, inspection, monitoring, or patrolling, which are implemented by the communication between remote sites via the management system 10. In the following description, the terminal apparatus (image capturing device) 100a, the terminal apparatus (information terminal) 100b, and the terminal apparatus (information terminal) 100c will be simply referred to as the terminal apparatus 100a, the terminal apparatus 100b, and the terminal apparatus 100c, respectively. Further, any of the terminal apparatuses 100a, 100b, and 100c will be referred to as the terminal apparatus 100 where the distinction therebetween is unnecessary.

In the example of FIG. 1, the communication system 1 includes the terminal apparatuses 100a and 100b located at the site SA, the terminal apparatus 100c located at the site SB, a communication management apparatus 11, a relay apparatus 12, and a file server 13. The communication management apparatus 11, the relay apparatus 12, and the file server 13 may be included in the single management system 10. Alternatively, the file server 13 may implemented by a cloud service outside the communication system 1, for example.

The terminal apparatuses 100a to 100c are communicable with the communication management apparatus 11, the relay apparatus 12, and the file server 13 via the communication network 2. The communication network 2 is implemented by the Internet, a mobile communication network, or a local area network (LAN), for example. The communication network 2 may include, as well as a wired communication network, a wireless communication network conforming to a standard such as third generation (3G), fourth generation (4G), fifth generation (5G), wireless fidelity (Wi-Fi®), worldwide interoperability for microwave access (WiMAX), or long term evolution (LTE).

The terminal apparatus 100a is an image capturing device used by the user UA at the site SA. For example, the terminal apparatus 100a transmits, via the management system 10, content data of a captured image of a subject or surroundings at the site SA to the other terminal apparatuses 100b and 100c participating in an event. The content data transmitted by the terminal apparatus 100a may represent video image, still image, or both thereof. The captured image may include sound as well as image.

Herein, the terminal apparatus 100a is an example of a transmitter terminal that participates in an event provided by the management system 10 and is used mainly to transmit the content data. The transmitter terminal is not limited to the image capturing device, and may be a video conference terminal, an interactive whiteboard (IWB), which is an electronic whiteboard intercommunicable with another apparatus, or a mobile unit such as a robot that moves around in a distribution site, for example.

The site SA where the terminal apparatus 100a is installed may be an outdoor location such as outside an office, a construction site, a substation, a farm, a field, a plantation, cropland, or a disaster site, for example. The site SA may also be an indoor location such as a school, a warehouse, a commercial facility, a hospital, or a care facility, for example. That is, the site SA where the terminal apparatus 100a is installed may be any location with a need for a remote event, such remote meeting or inspection, to communicate with the user UB at the site SB.

The terminal apparatus 100b is an information terminal, such as a personal computer (PC), a smartphone, a tablet terminal, or a wearable terminal, for example, used by the user UA at the site SA. With the terminal apparatus 100b, the user UA displays the captured image transmitted from the terminal apparatus 100a, for example. Further, with the terminal apparatus 100b, the user UA transmits and receives the content data such as the image or audio data to and from the terminal apparatus 100c to interact with the user UB. The terminal apparatus 100b is an example of a receiver terminal that participates in the event provided by the management system 10 and is used mainly to receive the content data.

The terminal apparatus 100c is an information terminal, such as a PC, a smartphone, a tablet terminal, or a wearable terminal, for example, used by the user UB at the site SB. With the terminal apparatus 100c, the user UB displays the captured image transmitted from the terminal apparatus 100a, for example. Further, with the terminal apparatus 100c, the user UB transmits and receives the content data such as the image or audio data to and from the terminal apparatus 100b to interact with the user UA. The terminal apparatus 100c is an example of a regular terminal that participates in the event provided by the management system 10 and transmits and receives the content data, for example. The communication system 1 may include two or more regular terminals.

Each of the terminal apparatuses 100b and 100c is not limited to the general-purpose information terminal, and may be a head mounted display (HMD) or the above-described IWB, for example.

The communication management apparatus 11 is an information processing apparatus configured as a computer, or is a system including a plurality of computers, for example. The communication management apparatus 11 performs the call control in communication (i.e., an event) for transmitting and receiving the content data between the plurality of terminal apparatuses 100 and the authentication and authorization of the terminal apparatuses 100, for example. The communication management apparatus 11 functions as a signaling server in Web real-time communication (WebRTC) that enables real-time communication on a Web browser, for example.

The relay apparatus 12 is an information processing apparatus configured as a computer, or is a system including a plurality of computers, for example. The relay apparatus 12 relays first communication in which the plurality of terminal apparatuses 100 transmit and receive the content data therebetween. For example, when the terminal apparatuses 100a to 100c are participating in the same communication (i.e., event), the relay apparatus 12 transfers the content data transmitted by the terminal apparatus 100a to the other terminal apparatuses 100b and 100c. In this case, the relay apparatus 12 similarly transfers the content data transmitted by the terminal apparatus 100b to the other terminal apparatuses 100a and 100c, and transfers the content data transmitted by the terminal apparatus 100c to the other terminal apparatuses 100a and 100b. The relay apparatus 12 functions as a selective forwarding unit (SFU) in WebRTC, for example.

The file server 13 is an information processing apparatus configured as a computer, or is a system including a plurality of computers, for example. The file server 13 provides the terminal apparatus 100 with a Web application in, for example, a hypertext markup language (HTML) or JavaScript® file operable on a Web browser of the terminal apparatus 100.

It is assumed in the communication system 1 of FIG. 1 that the sites SA and SB are provided with respective private or local networks with different network address translation (NAT) routers, for example. Herein, a NAT router is a network device that converts a private interne protocol (IP) address into a public IP address. It is also assumed here that the communication management apparatus 11, the relay apparatus 12, and the file server 13 have respective public IP addresses.

With the above-described configuration, the terminal apparatus 100a is capable of performing the first communication of transmitting and receiving the content data to and from the terminal apparatus 100b or 100c via the relay terminal 12. With the communication management apparatus 11, the terminal apparatus 100a is also capable of performing second communication, i.e., direct peer-to-peer (P2P) communication, with the terminal apparatus 100b located in the same private network as that of the terminal apparatus 100a. The terminal apparatus 100a is, however, incapable of performing the second communication, i.e., the direct P2P communication, with the terminal apparatus 100c located in a private network different from that of the terminal apparatus 100a.

In the present embodiment, the terminal apparatus 100 performs the first communication or the second communication with a Web browser or an application functioning as a Web browser (e.g., a mobile application).

Figure 2:
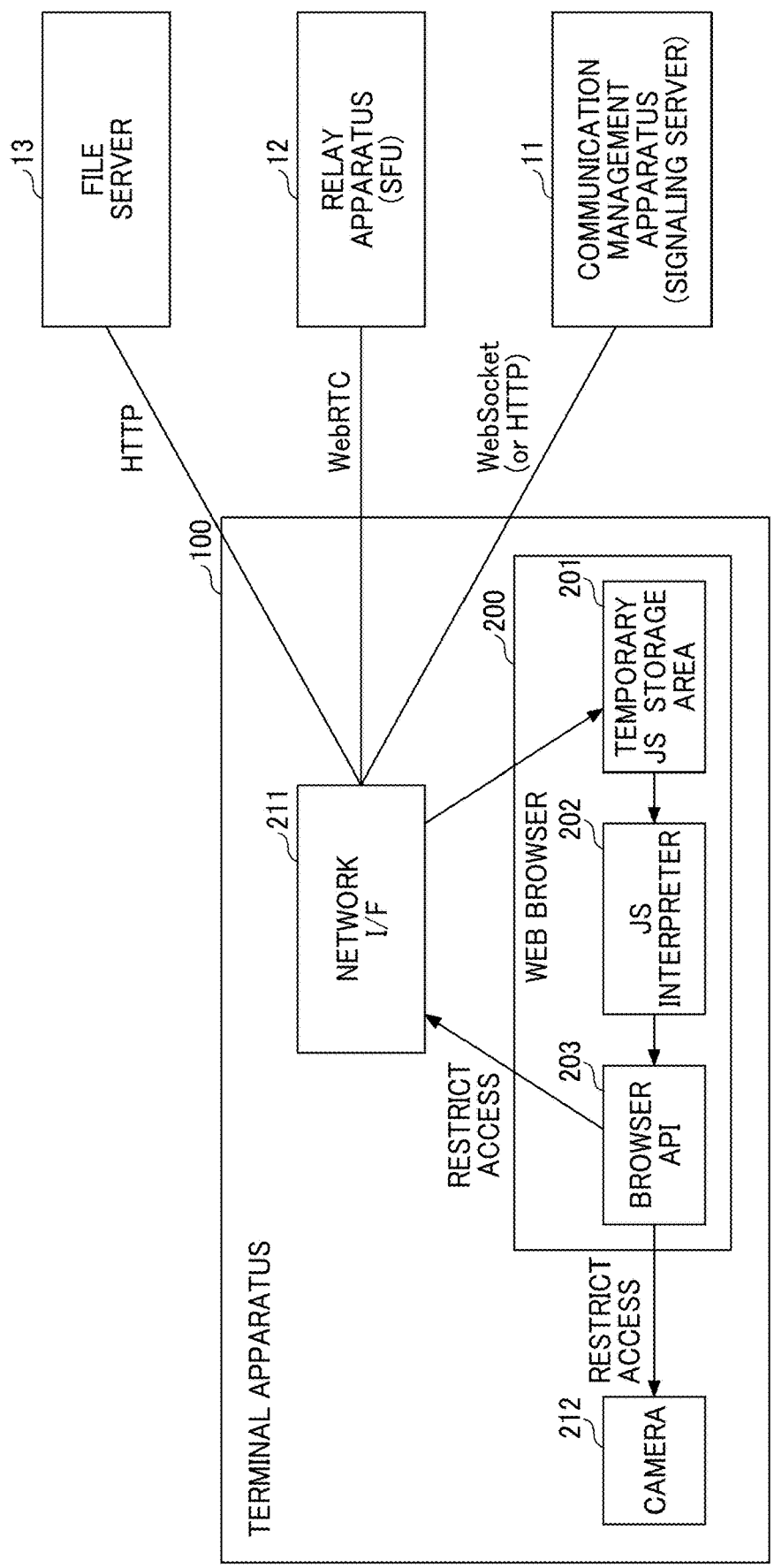
FIG. 2 is a diagram illustrating access restriction by a Web browser included in the communication system of the first embodiment.

FIG. 2 is a diagram illustrating access restriction by a Web browser of the first embodiment. A Web browser 200 executed by the terminal apparatus 100 receives from the file server 13 a JavaScript® (hereinafter referred to as JS) file according to the hypertext transfer protocol (HTTP), for example, and stores the received JS file in a temporary JS storage area 201. A JS interpreter 202 of the Web browser 200 executes the code of the JS file stored in the temporary JS storage area 201. With an application programming interface (API) provided by the Web browser 200 (hereinafter referred to as the browser API 203), the JS interpreter 202 accesses a device such as a network interface (I/F) 211 or a camera 212.

In the Web browser 200, however, the access to the device such as the network I/F 211 or the camera 212 is restricted for security and privacy protection, for example. This access restriction prevents a program executed by the JS interpreter 202 (e.g., the code of the JS file) from acquiring the information of a data link layer or a neighboring terminal apparatus, for example, with the browser API 203. In a typical communication system in which the first communication is performed with a browser API of a Web browser, therefore, it is difficult to optimize the bandwidth control of the first communication.

The bandwidth control may be performed not with network topology information but with a special relay apparatus that performs QoS control in accordance with a command from a terminal apparatus, for example. This method, however, requires the special relay apparatus that performs the QoS control in accordance with the command from the terminal apparatus.

In the communication system 1 of the first embodiment performing the first communication, on the other hand, the communication management apparatus 11 optimizes the bandwidth control of the first communication based on the network topology information with the browser API 203 of the Web browser 200.

In the system configuration of FIG. 1, there is a demand to restrict, as much as possible, the communication bandwidth of the terminal apparatus 100b connected to the router 101, to which the terminal apparatus 100a is also connected, in order to distribute the image captured by the terminal apparatus 100a to the site SB in the highest possible quality.

The terminal apparatus 100a of the first embodiment therefore determines whether the terminal apparatus 100a is capable of performing the second communication without intervening the relay apparatus 12 with each of the terminal apparatuses 100b and 100c performing the first communication with the terminal apparatus 100a. The terminal apparatus 100a then transmits the determination to the communication management apparatus 11. In this disclosure, communication without intervening the relay apparatus may be alternatively referred to as communication that bypasses the relay apparatus.

If the terminal apparatus 100a is capable of performing the second communication with the terminal apparatus 100b performing the first communication with the terminal apparatus 100a, the communication management apparatus 11 determines that the terminal apparatus 100b is located in the same private network as that of the terminal apparatus 100a and is sharing a NAT router, for example, with the terminal apparatus 100a. If the terminal apparatus 100a is incapable of performing the second communication with the terminal apparatus 100c performing the first communication with the terminal apparatus 100a, the communication management apparatus 11 determines that the terminal apparatus 100c is located in a private network different from that of the terminal apparatus 100a and is not sharing a NAT router with the terminal apparatus 100a. The communication management apparatus 11 of the first embodiment thus has a function of assessing the network configuration (i.e., network topology) based on the determination transmitted from the terminal apparatus 100a.

The communication management apparatus 11 further instructs the relay apparatus 12, which relays the first communication, to restrict the communication bandwidth for the first communication of the terminal apparatus 100b, which is located in the same private network as that of the terminal apparatus 100a and is sharing the NAT router with the terminal apparatus 100a. Preferably, for example, the communication management apparatus 11 may instruct the relay apparatus 12 to restrict the transmission bandwidth for the first communication of the terminal apparatus 100b.

In the system configuration illustrated in FIG. 1, therefore, the communication bandwidth of the terminal apparatus 100b connected to the router 101, to which the terminal apparatus 100a is also connected, is restricted to distribute the image captured by the terminal apparatus 100a to the site SB in the highest possible quality.

According to the communication system 1 of the first embodiment, in which the plurality of terminal apparatuses 100 transmit and receive the content data therebetween with the browser API 203 of the Web browser 200, the bandwidth control is optimized based on the network topology information, as described above. The communication system 1 of the first embodiment therefore obviates the need for a special relay apparatus that performs QoS control in accordance with a command from a terminal apparatus.

The system configuration of the communication system 1 illustrated in FIG. 1 is illustrative. The terminal apparatus 100a is not necessarily required to have an image capturing function as long as the terminal apparatus 100a has a function of distributing the content data to the other terminal apparatuses 100b and 100c, for example. For instance, the terminal apparatus 100a may be an IWB (i.e., electronic whiteboard) that distributes the content data, such as a captured image input from outside the terminal apparatus 100a or a capture image, to the other terminal apparatuses 100b and 100c. Further, the management system 10 is not limited to a physical machine (i.e., computer), and may be implemented by a program executed by a virtual machine running on a cloud environment, for example.

A description will be given of respective hardware configurations of apparatuses forming the communication system 1 of the first embodiment.

A hardware configuration of the terminal apparatus 100a will first be described.

Figure 3:
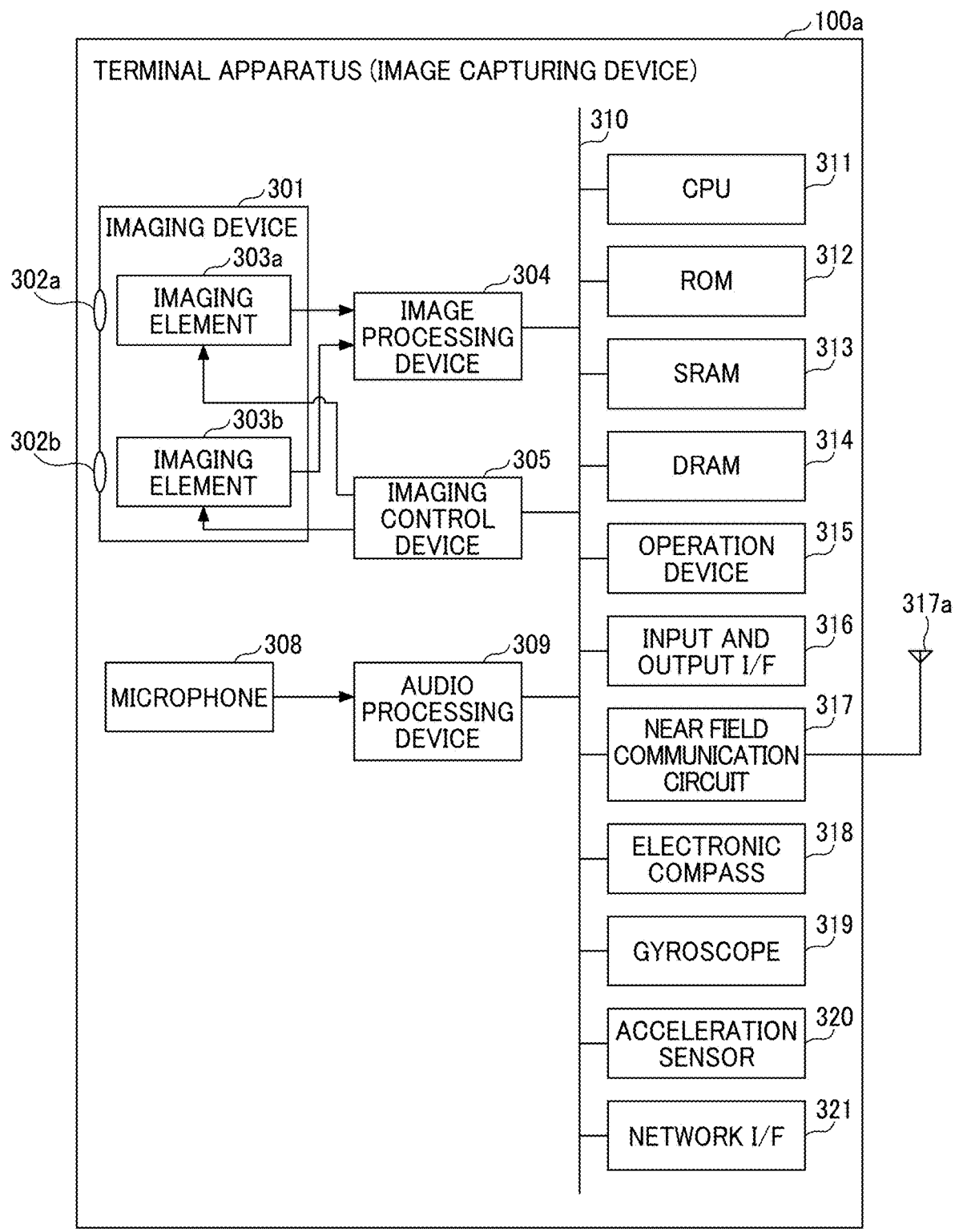
FIG. 3 is a diagram illustrating an example of the hardware configuration of a terminal apparatus (an image capturing device) included in the communication system of the first embodiment.

FIG. 3 is a diagram illustrating an example of the hardware configuration of the terminal apparatus 100a of the first embodiment. FIG. 3 illustrates an example in which the terminal apparatus 100a is a full spherical image capturing device that captures the image of a subject or surroundings to acquire a full spherical image of the subject or surroundings. Alternatively, the terminal apparatus 100a may be a typical digital camera, a camera that acquires a normal flat image such as a camera mounted on a smartphone, or a wide-angle camera capable of acquiring a wide-angle image with at least a particular angle of view. Further, although the terminal apparatus 100a described below is a full spherical (i.e., all-directional) image capturing device with two imaging elements, the terminal apparatus 100a may include more than two imaging elements. Furthermore, the terminal apparatus 100a is not necessarily required to be dedicated to capturing the all-directional image. An all-directional image capturing device may be attached to a typical digital camera or smartphone as an add-on component to make the digital camera or smartphone practically function as the terminal apparatus 100a.

As illustrated in FIG. 3, the terminal apparatus 100a includes an imaging device 301, an image processing device 304, an imaging control device 305, a microphone 308, an audio processing device 309, a central processing unit (CPU) 311, a read only memory (ROM) 312, a static random access memory (SRAM) 313, a dynamic random access memory (DRAM) 314, an operation device 315, an input and output I/F 316, a near field communication circuit 317, an antenna 317a for the near field communication circuit 317, an electronic compass 318, a gyroscope 319, an acceleration sensor 320, and a network I/F 321, for example.

The imaging device 301 includes two wide-angle (i.e., fisheye) lenses 302a and 302b (hereinafter referred to as the lenses 302 where the distinction therebetween is unnecessary) and two imaging elements 303a and 303b corresponding thereto. Each of the lenses 302 has an angle of view of at least 180 degrees to form a hemispherical image.

Each of the imaging elements 303a and 303b includes an image sensor, a timing signal generating circuit, and a group of registers, for example. The image sensor may be a complementary metal oxide semiconductor (CMOS) or charge coupled device (CCD) sensor that converts an optical image formed by the lens 302a or 302b into image data in the form of electrical signals and outputs the image data. The timing signal generating circuit generates a horizontal or vertical synchronization signal or a pixel clock signal for the image sensor. Various commands or parameters for the operation of the imaging element 303a or 303b are set in the group of registers.

Each of the imaging elements 303a and 303b of the imaging device 301 is connected to the image processing device 304 via a parallel I/F bus, and is connected to the imaging control device 305 via a serial I/F bus (e.g., an inter-integrated circuit ($I^2C$) bus). The image processing device 304, the imaging control device 305, and the audio processing device 309 are connected to the CPU 311 via a bus 310. The bus 310 is further connected to the ROM 312, the SRAM 313, the DRAM 314, the operation device 315, the input and output I/F 316, the near field communication circuit 317, the electronic compass 318, the gyroscope 319, the acceleration sensor 320, and the network I/F 321, for example.

The image processing device 304 receives image data items from the imaging elements 303a and 303b via the parallel I/F bus, performs a particular process on the image data items, combines the processed image data items to generate the data of an equirectangular projection image.

The imaging control device 305 sets commands in the groups of registers of the imaging elements 303a and 303b via the serial I/F bus such as the $I^2C$ bus, with the imaging control device 305 and the imaging elements 303a and 303b normally acting as a master device and slave devices, respectively. The imaging control device 305 receives the commands from the CPU 311. The imaging control device 305 further receives data such as status data from the groups of registers in the imaging elements 303a and 303b via the serial I/F bus such as the $I^2C$ bus, and transmits the received data to the CPU 311.

The imaging control device 305 further instructs the imaging elements 303a and 303b to output the image data when a shutter button of the operation device 315 is pressed. The terminal apparatus 100a may have a preview display function or a video display function using a display (e.g., a display of an external terminal such as a smartphone that performs near field communication with the terminal apparatus 100a with the near field communication circuit 317). In this case, the imaging elements 303a and 303b continuously output the image data at a particular frame rate (number of frames per minute).

The imaging control device 305 also functions as a synchronization controller that cooperates with the CPU 311 to synchronize the image data output time between the imaging elements 303a and 303b. In the present embodiment, the terminal apparatus 100a is not equipped with a display. The terminal apparatus 100a, however, may be equipped with a display. The microphone 308 converts sound into audio (signal) data. The audio processing device 309 receives the audio data from the microphone 308 via an I/F bus, and performs a particular process on the audio data.

The CPU 311 executes a program previously stored in the ROM 312, for example, to control overall operation of the terminal apparatus 100a and execute various processes. The ROM 312 stores various programs for the CPU 311. The SRAM 313 and the DRAM 314 are working memories for storing programs executed by the CPU 311 and data being processed. The DRAM 314 particularly stores image data being processed in the image processing device 304 and processed data of the equirectangular projection image.

The operation device 315 collectively refers to components such as a power switch, various operation buttons including the shutter button, and a touch panel having a display function and an operation function. The user UA operates the operation device 315 to input various image capturing modes and image capturing conditions, for example.

The input and output I/F 316 collectively refers to interface circuits (e.g., a universal serial bus (USB) I/F circuit) connectable to an external medium (e.g., a secure digital (SD) card) and a PC, for example. The input and output I/F 316 may be a wireless or wired interface. Via the input and output I/F 316, the data of the equirectangular projection image stored in the DRAM 314 is recorded on an external medium, or is transmitted as necessary to an external terminal (apparatus).

The near field communication circuit 317 communicates with the external terminal (apparatus) via the antenna 317a of the terminal apparatus 100a in wireless communication conforming to a standard such as near field communication (NFC), Bluetooth®, or Wi-Fi®. The near field communication circuit 317 may be used to transmit the data of the equirectangular projection image to the external terminal (apparatus).

The electronic compass 318 calculates the orientation of the terminal apparatus 100a from the geomagnetism and outputs orientation information. The orientation information is an example of related information (metadata) conforming to the exchangeable image file format (Exif). The orientation information is used in image processing such as image correction of the captured image. The related information includes data such as the date and time of capturing the image and the data capacity of the image data. The gyroscope 319 is a sensor that detects changes in angles (i.e., the roll angle, the pitch angle, and the yaw angle) of the terminal apparatus 100a accompanying the movement of the terminal apparatus 100a. The changes in the angles are an example of the related information (metadata) conforming to the Exif, and are used in image processing such as image correction of the captured image. The acceleration sensor 320 is a sensor that detects the respective accelerations in three axial directions.

The terminal apparatus 100a calculates the attitude thereof (i.e., the angle of the terminal apparatus 100a relative to the gravitational direction) based on the accelerations detected by the acceleration sensor 320. Equipped with the acceleration sensor 320, the terminal apparatus 100a is improved in the accuracy of image correction. The network I/F 321 is an interface for performing data communication using the communication network 2 such as the Internet via a router, for example. The network I/F 321 corresponds to the network I/F 211 in FIG. 2.

A hardware configuration of a computer included in the communication system 1 will be described.

Figure 4:
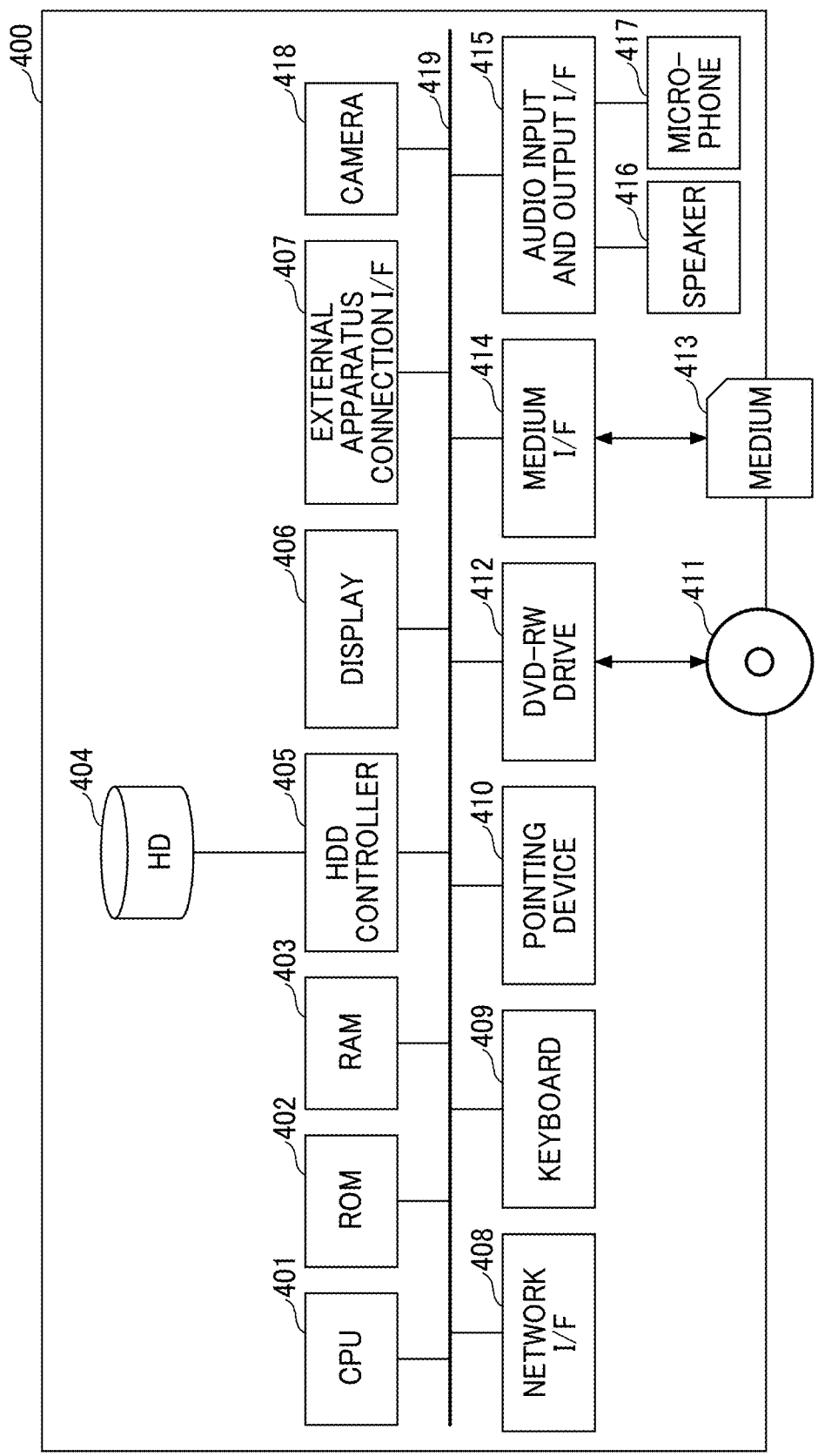
FIG. 4 is a diagram illustrating an example of the hardware configuration of a computer included in the communication system of the first embodiment.

Each of the terminal apparatuses 100b and 100c has the hardware configuration of a computer 400 illustrated in FIG. 4, for example. Further, each of the communication management apparatus 11, the relay apparatus 12, and the file server 13 is implemented by one or more computers each configured as the computer 400, for example.

FIG. 4 is a diagram illustrating an example of the hardware configuration of the computer 400 of the first embodiment. As illustrated in FIG. 4, the computer 400 includes a CPU 401, a ROM 402, a RAM 403, a hard disk (HD) 404, a hard disk drive (HDD) controller 405, a display 406, an external apparatus connection I/F 407, a network I/F 408, a keyboard 409, a pointing device 410, a digital versatile disk-rewritable (DVD-RW) drive 412, a medium I/F 414, an audio input and output I/F 415, a speaker 416, a microphone 417, a camera 418, and a bus line 419, for example.

The CPU 401 controls overall operation of the computer 400. The ROM 402 stores a program used to start the computer 400, such as an initial program loader (IPL), for example. The RAM 403 is used as a working area of the CPU 401, for example. The HD 404 stores an operating system (OS), applications, programs such as device drivers, and various data, for example. The HDD controller 405 controls writing and reading of various data to and from the HD 404 under the control of the CPU 401, for example.

The display 406 displays various information such as a cursor, menus, windows, text, and images, for example. The display 406 may be provided outside the computer 400. The external apparatus connection I/F 407 is an interface for connecting various external apparatuses to the computer 400, such as a USB interface, for example. The network I/F 408 is an interface for the computer 400 to communicate with another apparatus via the communication network 2, for example. In each of the terminal apparatuses 100b and 100c implemented by the computer 400, the network I/F 408 corresponds to the network I/F 211 in FIG. 2.

The keyboard 409 is an input device including a plurality of keys for inputting text, numerical values, and various instructions, for example. The pointing device 410 is an input device used to select and execute various instructions, select a processing target, or move the cursor, for example. The keyboard 409 and the pointing device 410 may be provided outside the computer 400. The DVD-RW drive 412 controls writing and reading of various data to and from a DVD-RW 411 as an example of a removable recording medium. The DVD-RW 411 is not limited to the DVD-RW, and may be replaced by another type of recording medium.

The medium I/F 414 controls writing (i.e., storage) and reading of data to and from a medium 413 such as a flash memory. The audio input and output I/F 415 is a circuit that processes the input of audio signals from the microphone 417 and the output of audio signals to the speaker 416 under the control of the CPU 401. The speaker 416 is a built-in device that converts electrical signals into physical vibration to produce sound such as music or voice. The microphone 417 is a built-in device that converts sound into electrical signals. The bus line 419 includes address buses, data buses, and various control signal lines for electrically connecting the above-described components.

The hardware configuration of the computer 400 illustrated in FIG. 4 is illustrative. The computer 400 may have a desired configuration as long as the computer 400 includes the CPU 401, the ROM 402, the RAM 403, the network I/F 408, and the bus line 419, for example.

A functional configuration of the communication system 1 of the first embodiment will be described.

Figure 5:
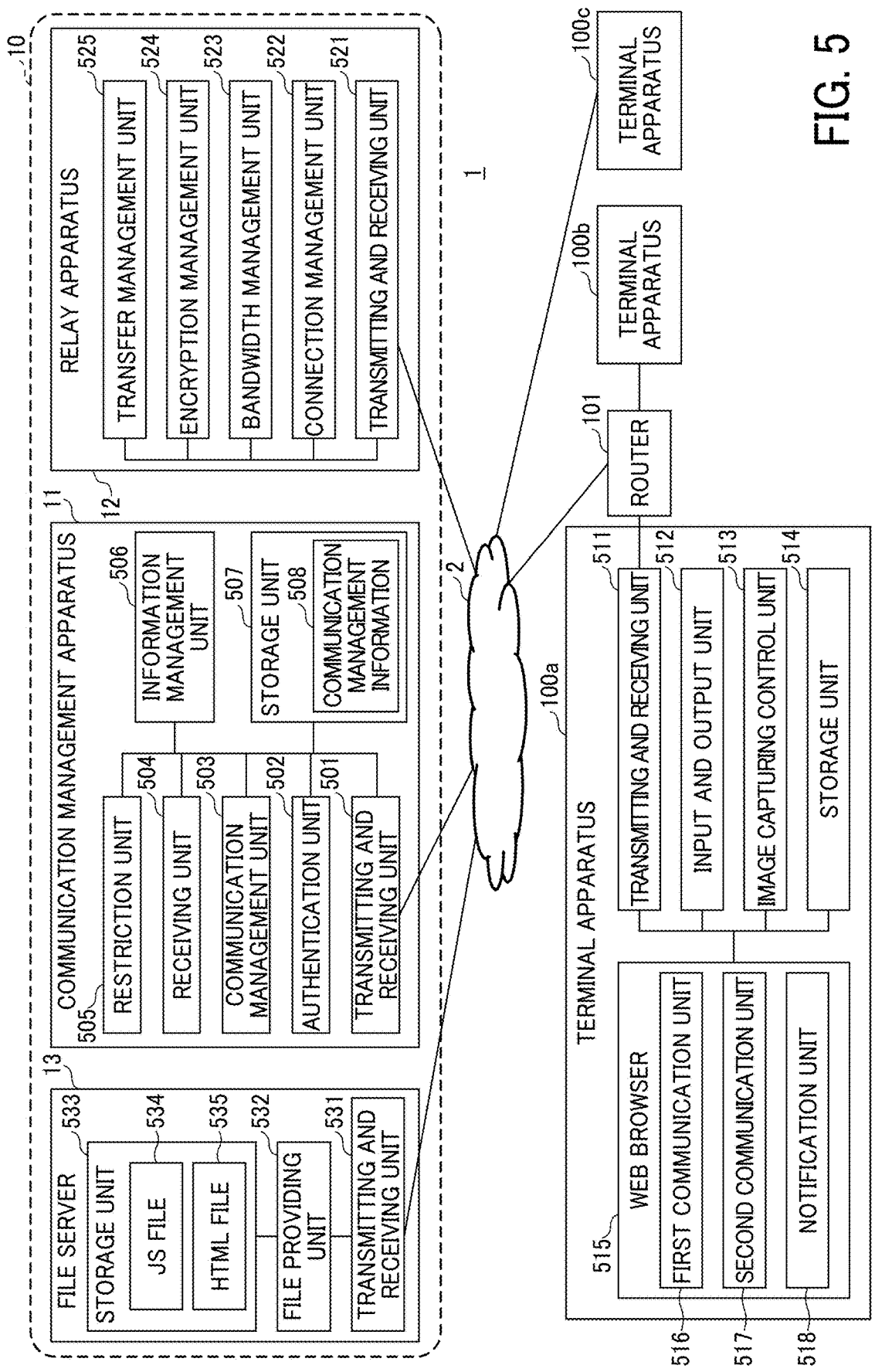
FIG. 5 is a diagram illustrating an example of the functional configuration of the communication system of the first embodiment.

FIG. 5 is a diagram illustrating an example of the functional configuration of the communication system 1 of the first embodiment. FIG. 5 illustrates functional units of the apparatuses of the communication system 1 in FIG. 1 related to later-described processes.

A functional configuration of the communication management apparatus 11 will first be described.

In the communication management apparatus 11, a transmitting and receiving unit 501, an authentication unit 502, a communication management unit 503, a receiving unit 504, a restriction unit 505, an information management unit 506, and a storage unit 507, for example, are implemented by the computer 400 executing a particular program. The above-described functional units may be at least partially implemented by hardware.

The transmitting and receiving unit 501 performs a transmitting and receiving process of connecting the communication management apparatus 11 to the communication network 2 with the network I/F 408, for example, and transmitting and receiving data or information to and from another apparatus. The authentication unit 502 performs an authentication process of authenticating and authorizing the terminal apparatus 100 or a user accessing the communication management apparatus 11.

The communication management unit 503 performs a communication management process of managing the first communication in which the plurality of terminal apparatuses 100 transmit and receive therebetween the content data such as the image or audio data via the relay apparatus 12. For example, the communication management unit 503 manages the first communication with communication management information 508 illustrated in FIG. 6.

FIG. 6 is a diagram illustrating an example of the communication management information 508 of the first embodiment. In the example of FIG. 6, the communication management information 508 includes information items such as "identifier (ID)," "available room ID," "terminal type," and "password." The item "ID" is identification information for identifying the terminal apparatus 100, the Web browser 200 of the terminal apparatus 100, or the application functioning as a Web browser, for example. It is assumed in the following description that the item "ID" is identification information for identifying the terminal apparatus 100, for example.

The item "available room ID" (hereinafter simply referred to as the room ID) is identification information for identifying a communication session available for participation (i.e., a room available for joining) by the terminal apparatus 100. For instance, the example of FIG. 6 indicates that the rooms (e.g., chat rooms) with room IDs "Room1," "Room2," and "Room3" are available for joining by the terminal apparatus 100 with an ID "B0001" (e.g., the terminal apparatus 100*a*). The example further indicates that the rooms with room IDs "Room 1," "Room4," and "Room5" are available for joining by the terminal apparatus 100 with an ID "B0002" (e.g., the terminal apparatus 100*b*), and that the room with the room ID "Room1" is available for joining by the terminal apparatus 100 with an ID "B0003" (e.g., the terminal apparatus 100*c*).

The item "terminal type" is information indicating whether the terminal apparatus 100 is the transmitter terminal (e.g., the terminal apparatus 100*a*), the receiver terminal (e.g., the terminal apparatus 100*b*), or the regular terminal (e.g., the terminal apparatus 100*c*), for example.

The item "password" is authentication information for authenticating the terminal apparatus 100. For example, if the combination of the ID and the password of the terminal apparatus 100 attempting to connect to the communication management apparatus 11 is stored in the communication management information 508, the authentication unit 502 authorizes the access of the terminal apparatus 100. The password is an example of the authentication information for authenticating the terminal apparatus 100. The authentication information for authenticating the terminal apparatus 100 may be another type of authentication information, such as an electronic certificate, an access token, or biometric information, for example.

In the communication management apparatus 11 serving as the signaling server in WebRTC, the communication management unit 503 further performs connection control of the second communication, i.e., the P2P communication, between the terminal apparatuses 100 in accordance with a protocol such as the interactive connectivity establishment (ICE) protocol. Herein, the ICE protocol refers to a series of protocols for setting the priority and checking the connection of connection candidates exchanged through messages such as "offer," "answer," and "icecandidate."

The receiving unit 504 receives, from a terminal apparatus 100, a determination of whether the terminal apparatus 100 is capable of performing the second communication with another terminal apparatus 100 without intervening the relay apparatus 12. For example, the receiving unit 504 receives a determination of whether the terminal apparatus 100*a* performing the first communication with the terminal apparatuses 100*b* and 100*c* is capable of performing the second communication with the terminal apparatuses 100*b* and 100*c*.

Based on the determination received by the receiving unit 504, the restriction unit 505 restricts the communication bandwidth for the first communication of the terminal apparatus 100 that is capable of performing the second communication with the terminal apparatus 100 that has transmitted the determination. For example, if the receiving unit 504 receives from the terminal apparatus 100*a* a determination that the terminal apparatus 100*a* is capable of performing the second communication with the terminal apparatus 100*b*, the restriction unit 505 restricts (e.g., reduces) the communication bandwidth for the first communication of the terminal apparatus 100*b*.

Preferably, for example, the restriction unit 505 mainly restricts the transmission bandwidth for the first communication of the terminal apparatus 100*b* in the communication bandwidth for the first communication of the terminal apparatus 100*b*.

The information management unit 506 stores and manages the communication management information 508, for example, in the storage unit 507. For example, the information management unit 506 causes a PC of an administrator to display a Web page for setting the communication management information 508, and receives the settings of items such as "ID," "available room ID," "terminal type," "and "password."

The storage unit 507 is implemented by a program executed by the CPU 401 and devices such as the HD 404, the HDD controller 405, and the RAM 403, for example. The storage unit 507 stores various programs, data, and information including the communication management information 508.

A functional configuration of the terminal apparatus 100 will be described.

In the terminal apparatus 100a, a transmitting and receiving unit 511, an input and output unit 512, an image capturing control unit 513, a storage unit 514, and a Web browser 515 are implemented by the CPU 311 in FIG. 3 executing a particular program, for example. The above-described functional units may be at least partially implemented by hardware.

In each of the terminal apparatuses 100b and 100c, functional units similar to those of the terminal apparatus 100a are assumed to be implemented by the CPU 401 in FIG. 4 executing a particular program, for example.

The transmitting and receiving unit 511 performs a communication process of connecting the terminal apparatus 100 to the communication network 2 with the network I/F 321 or 408 to enable the terminal apparatus 100 to communicate with another apparatus. The input and output unit 512 performs at least one of an input process of receiving an input operation performed by the user and an output process of outputting data for displaying a display screen or emitting sound or light, for example.

The image capturing control unit 513 performs an image capturing control process of controlling the imaging device 301, the image processing device 304, and the imaging control device 305 or controlling the camera 418 to acquire the data of the captured image of the surroundings of the terminal apparatus 100, for example.

The storage unit 514 performs a storage process of storing various information, data, and programs in a storage device such as the SRAM 313, the HD 404, or the RAM 403, for example.

The Web browser 515 downloads and executes a JS file 534 or an HTML file 535 from the file server 13 to implement a first communication unit 516, a second communication unit 517, and a notification unit 518, for example. The Web browser 515, which corresponds to the Web browser 200 described above with FIG. 2, provides the browser API 203 for WebRTC to a program executed by the Web browser 515, for example.

With the browser API 203 provided by the Web browser 515, the first communication unit 516 performs a first communication process of performing the first communication to transmit and receive the content data to and from another terminal apparatus 100 via the relay apparatus 12.

With the browser API 203 provided by the Web browser 515, the second communication unit 517 performs a second communication process of performing the second communication with another terminal apparatus 100 on a one-to-one basis. For example, with a WebRTC API provided by the Web browser 515, the second communication unit 517 performs the second communication, i.e., the P2P communication, in accordance with the ICE protocol.

The notification unit 518 performs a notification process of notifying the communication management apparatus 11 of the determination of whether the terminal apparatus 100 is capable of performing the second communication with each of the other terminal apparatuses 100 performing the first communication with the terminal apparatus 100. If the terminal apparatus 100 is the terminal apparatus 100b serving as the receiver terminal or the terminal apparatus 100c serving as the regular terminal, the terminal apparatus 100 may not include the notification unit 518.

A functional configuration of the relay apparatus 12 will be described.

In the relay apparatus 12, a transmitting and receiving unit 521, a connection 5 management unit 522, a bandwidth management unit 523, an encryption management unit 524, and a transfer management unit 525, for example, are implemented by the computer 400 executing a particular program. The above-described functional units may be at least partially implemented by hardware.

The transmitting and receiving unit 521 performs a transmitting and receiving process of connecting the relay apparatus 12 to the communication network 2 with the network I/F 408, for example, and transmitting and receiving data or information to and from another apparatus.

The connection management unit 522 performs a connection management process of managing the connection of the terminal apparatus 100 to the relay apparatus 12. For example, if a plurality of terminal apparatuses 100 request the connection by specifying the same room ID (i.e., session ID), the connection management unit 522 allows the terminal apparatuses 100 to join the same room (i.e., communication session).

The bandwidth management unit 523 performs a bandwidth management process of managing the communication bandwidth for the first communication of transmitting and receiving the content data via the relay apparatus 12. For example, the bandwidth management unit 523 restricts the communication bandwidth of the terminal apparatus 100 under the control of the communication management apparatus 11.

The encryption management unit 524 performs an encryption management process of managing the encryption with datagram transport layer security (DTLS), for example.

The transfer management unit 525 performs a transfer management process of transferring the content data between a plurality of terminal apparatuses 100 joining the same room (i.e., communication session).

A functional configuration of the file server 13 will be described.

In the file server 13, a transmitting and receiving unit 531, a file providing unit 532, and a storage unit 533 are implemented by the computer 400 executing a particular program, for example. The above-described functional units may be at least partially implemented by hardware.

The transmitting and receiving unit 531 performs a transmitting and receiving process of connecting the file server 13 to the communication network 2 with the network I/F 408, for example, and transmitting and receiving data or information to and from another apparatus.

The file providing unit 532 performs a file providing process of providing a program in the JS file 534 or the HTML file 535, for example, which is executed by the Web browser 515 to implement the first communication unit 516, the second communication unit 517, and the notification unit 518.

The storage unit 533 is implemented by a program executed by the CPU 401 and devices such as the HD 404, the HDD controller 405, and the RAM 403, for example. The storage unit 533 performs a storage process of storing a file such as the JS file 534 or the HTML file 535.

The file server 13 may be implemented by a cloud service outside the management system 10, for example.

A processing procedure of a communication management method of the first embodiment will be described.

A first communication process of the first embodiment will first be described.

Figure 7B:
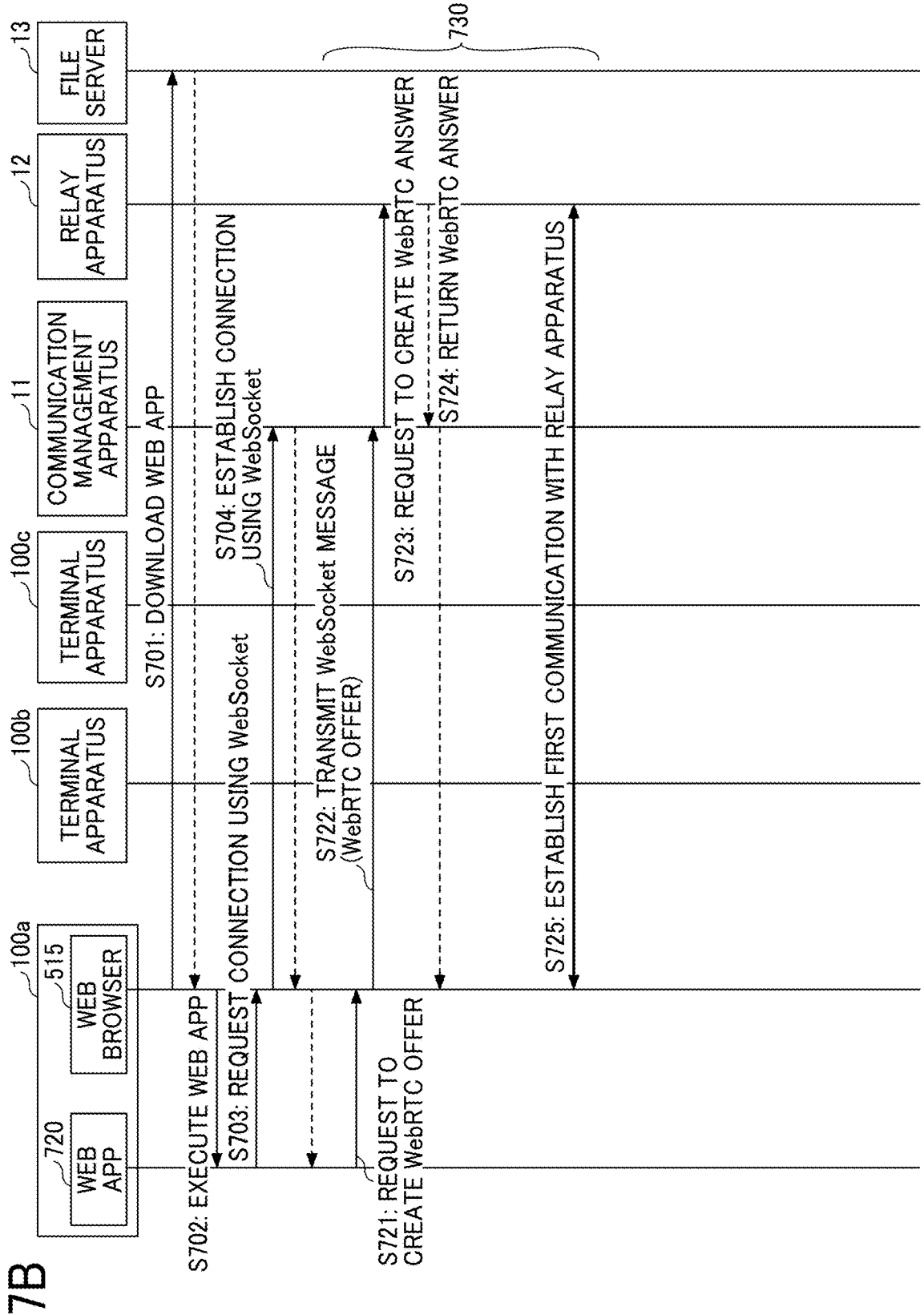
FIG. 7B is a sequence diagram illustrating another example of the first communication process of the first embodiment.

FIG. 7A is a sequence diagram illustrating an example of the first communication process of the first embodiment. In FIG. 7A, a broken arrow line represents a response message, and description thereof will be omitted where unnecessary. The same applies to FIGS. 7B, 8, 10, and 11.

At step S701, the Web browser 515 of the terminal apparatus 100a downloads a Web application 720 (hereinafter referred to as the Web app 720) in the JS file 534 or the HTML file 535, for example, from the file server 13. This process is automatically executed when the Web browser 515 accesses a particular uniform resource locator (URL), for example. It is assumed in the following description that the downloaded Web app 720 is in the JS file 534.

At step S702, the Web browser 515 of the terminal apparatus 100a executes the downloaded Web app 720 to implement, for example, the first communication unit 516, the second communication unit 517, and the notification unit 518 described above with FIG. 5.

At step S703, with the browser API 203 provided by the Web browser 515, the first communication unit 516 of the terminal apparatus 100a implemented by the Web app 720 (hereinafter simply referred to as the first communication unit 516) requests to connect to the communication management apparatus 11 in accordance with the WebSocket.

At step S704, the Web browser 515 of the terminal apparatus 100a establishes the connection with the communication management apparatus 11 in accordance with the WebSocket. Herein, the WebSocket is a communication protocol for providing bidirectional communication channels over a single transmission control protocol (TCP) connection.

At step S705, with the browser API 203 provided by the Web browser 515, the first communication unit 516 of the terminal apparatus 100a requests to connect to the room with the room ID "Room1" of the relay apparatus 12 as the transmitter terminal.

At step S706, the Web browser 515 of the terminal apparatus 100a transmits, through a WebSocket message to the communication management apparatus 11, a connection request to the relay apparatus 12 to request the connection to the room with the room ID "Room1" of the relay apparatus 12 as the transmitter terminal.

At step S707, in response to receipt of the valid connection request to the relay apparatus 12 from the terminal apparatus 100a, the communication management unit 503 of the communication management apparatus 11 transmits a request to create a WebRTC offer to the relay apparatus 12. The connection request to the relay apparatus 12 transmitted from the terminal apparatus 100a includes, for example, the ID, the password, and the room ID described above with FIG. 6. The authentication unit 502 of the communication management apparatus 11 performs an authentication process by determining whether the combination of the ID and the password included in the connection request to the relay apparatus 12 is registered in the communication management information 508. The authentication unit 502 further performs an authorization process by determining whether the room ID included in the connection request to the relay apparatus 12 is included in the available room IDs of the communication management information 508. The authentication unit 502 thereby determines the validity or invalidity of the connection request to the relay apparatus 12 received from the terminal apparatus 100a.

At step S708, in response to the request to create a WebRTC offer from the communication management apparatus 11, the connection management unit 522 of the relay apparatus 12 returns a WebRTC offer. The WebRTC offer is information transmitted by a party that starts communication in the signaling of WebRTC. The WebRTC offer includes the information of the content data, the connection information, and the information of a public key for sharing an encryption key described in the session description protocol (SDP), for example.

At step S709, in response to receipt of the WebRTC offer, the first communication unit 516 of the terminal apparatus 100a requests the Web browser 515 to create a WebRTC answer. The WebRTC answer is information returned by a party that receives the WebRTC offer in the signaling of WebRTC. The WebRTC answer also includes the information of the content data, the connection information, and the information of a public key for sharing an encryption key described in the SDP, for example.

At step S710, the first communication unit 516 of the terminal apparatus 100a returns a WebRTC answer created by the Web browser 515 to the relay apparatus 12 via the Web browser 515, for example. At step S711, the first communication unit 516 of the terminal apparatus 100a thereby establishes the first communication with the relay apparatus 12. For example, the terminal apparatus 100a shares an encryption key for DTLS encryption with the relay apparatus 12, and transmits and receives the content data such as the image or audio data to and from the relay apparatus 12 by encrypting the content data with the shared encryption key.

In the above-described first communication process, the relay apparatus 12 creates the WebRTC offer, and the Web browser 515 creates the WebRTC answer. Alternatively, the Web browser 515 may create the WebRTC offer, and the relay apparatus 12 may create the WebRTC answer. For example, the communication system 1 may execute a process 730 of FIG. 8B, which includes steps S721 to S725, in place of the processes of steps S705 to S711 in FIG. 7A.

At step S721, with the browser API 203 provided by the Web browser 515, the first communication unit 516 of the terminal apparatus 100a requests to create a WebRTC offer. The request to create a WebRTC offer includes the information of a request to connect to the room with the room ID "Room1" of the relay apparatus 12 as the transmitter terminal, for example.

At step S722, the Web browser 515 of the terminal apparatus 100a transmits a WebRTC offer to the communication management apparatus 11 through a WebSocket message thereto. The WebSocket message includes, as well as the WebRTC offer created by the Web browser 515, the information of the request to connect to the room with the room ID "Room1" of the relay apparatus 12 as the transmitter terminal, for example.

At step S723, in response to receipt of the WebRTC offer from the terminal apparatus 100a, the communication management unit 503 of the communication management apparatus 11 transmits a request to create a WebRTC answer to the relay apparatus 12.

At step S724, in response to the request to create a WebRTC answer from the communication management apparatus 11, the connection management unit 522 of the relay apparatus 12 creates and returns a WebRTC answer to the terminal apparatus 100a. At step S725, the terminal apparatus 100a thereby establishes the first communication with the relay apparatus 12.

At step S712 in FIG. 7A, the terminal apparatus 100b executes a process 700, which is similar to the processes of steps S701 to S711, to establish the first communication with the relay apparatus 12. In the process of step S706, however, the Web browser 515 of the terminal apparatus 100b transmits a connection request to the relay apparatus 12 through a WebSocket message to the communication management apparatus 11 to request to connect to the room with the room ID "Room1" of the relay apparatus 12 as the receiver terminal.

At step S713, the terminal apparatus 100c executes the process 700, which is similar to the processes of steps S701 to S711, to establish the first communication with the relay apparatus 12. In the process of step S706, however, the Web browser 515 of the terminal apparatus 100c transmits a connection request to the relay apparatus 12 through a WebSocket message to the communication management apparatus 11 to request to connect to the room with the room ID "Room 1" of the relay apparatus 12 as the regular terminal.

In steps S712 and S713, the communication system 1 may execute processes similar to those of steps S721 to S725 (i.e., step S730) in FIG. 7B to establish the first communication.

With the above-described processes, the terminal apparatuses 100a, 100b, and 100c perform the first communication of transmitting and receiving the content data therebetween via the relay apparatus 12. For example, the content data transmitted by the terminal apparatus 100a at step S714 is transferred to the other terminal apparatuses 100b and 100c at steps S715 and S716, respectively, by the relay apparatus 12. Similarly, the content data transmitted by the terminal apparatus 100b is transferred to the other terminal apparatuses 100a and 100c by the relay apparatus 12. Further, the content data transmitted by the terminal apparatus 100c is transferred to the other terminal apparatuses 100a and 100b by the relay apparatus 12.

The examples of the first communication process illustrated in FIGS. 7A and 7B are illustrative. For example, the communication of the terminal apparatus 100 is not limited to the communication using the WebSocket, and the terminal apparatus 100 may communicate control information with the communication management apparatus 11 through polling using the HTTP.

A bandwidth restriction process of the first embodiment will be described.

Figure 8:
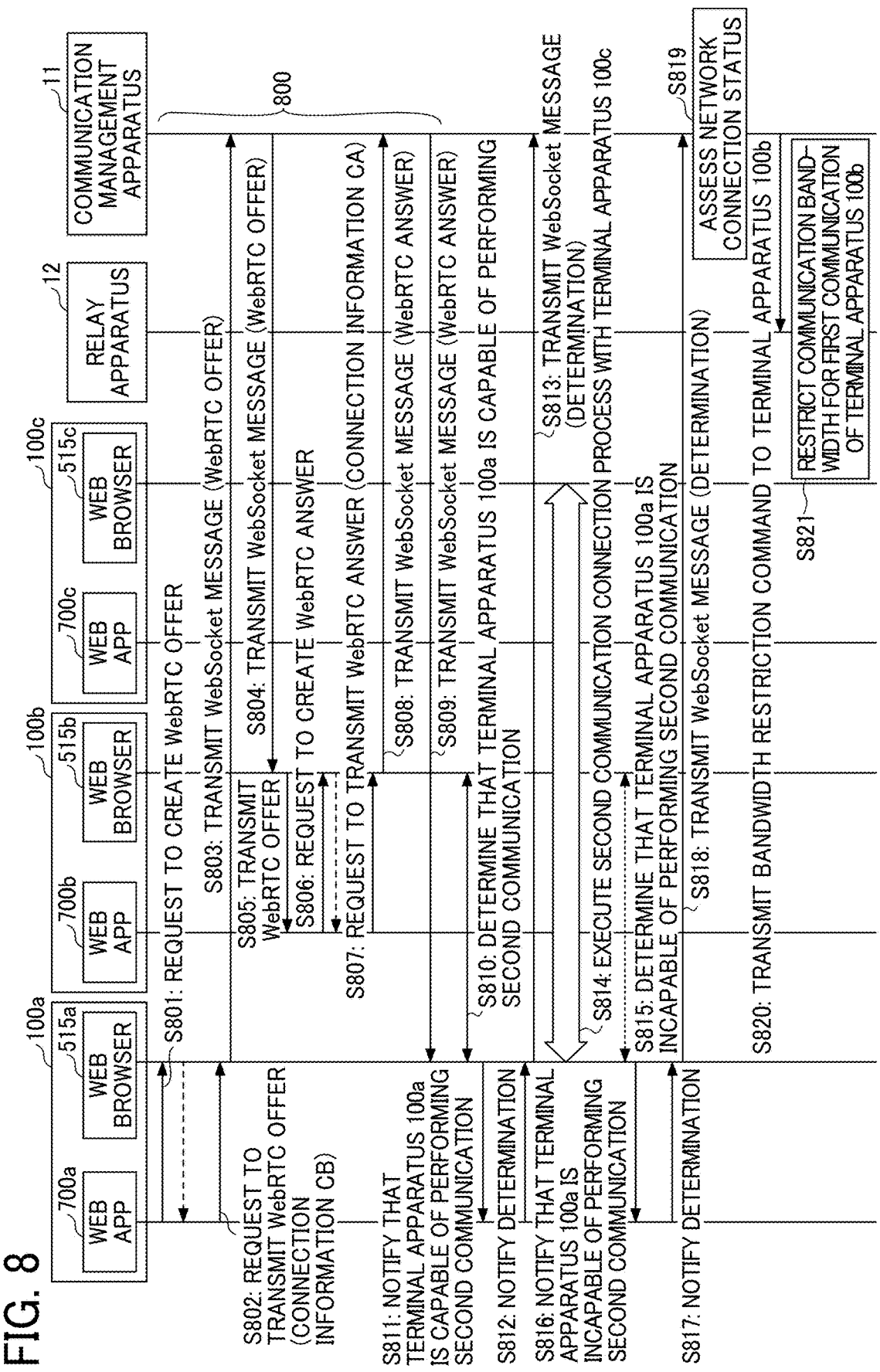
FIG. 8 is a sequence diagram illustrating an example of a bandwidth restriction process of the first embodiment.

FIG. 8 is a sequence diagram illustrating an example of the bandwidth restriction process of the first embodiment. It is assumed here that, at the beginning of the bandwidth restriction process of FIG. 8, the first communication process of FIG. 7A or 7B has been executed in the communication system 1; the terminal apparatuses 100a, 100b, and 100c are performing the first communication of transmitting and receiving the content data therebetween via the relay apparatus 12.

At step S801, the second communication unit 517 of the terminal apparatus 100a implemented by a Web app 700a (hereinafter simply referred to as the second communication unit 517) requests a Web browser 515a of the terminal apparatus 100a to create a WebRTC offer. The WebRTC offer includes connection information of the terminal apparatus 100b (hereinafter referred to as the connection information CB), for example.

At step S802, the second communication unit 517 of the terminal apparatus 100a requests the Web browser 515a of the terminal apparatus 100a to transmit the created WebRTC offer. At step S803, the Web browser 515a thereby transmits the WebRTC offer addressed to the terminal apparatus 100b through a WebSocket message to the communication management apparatus 11, for example.

At step S804, in response to receipt from the terminal apparatus 100a of the WebRTC offer addressed to the terminal apparatus 100b, the connection management unit 522 of the communication management apparatus 11 transmits the WebRTC offer to the terminal apparatus 100b through a WebSocket message thereto, for example.

At step S805, the second communication unit 517 of the terminal apparatus 100b implemented by a Web app 700b receives the WebRTC offer from the terminal apparatus 100a. At step S806, in response to the WebRTC offer, the second communication unit 517 requests a Web browser 515b of the terminal apparatus 100b to create a WebRTC answer. The WebRTC answer includes connection information of the terminal apparatus 100a (hereinafter referred to as the connection information CA), for example.

At step S807, the second communication unit 517 of the terminal apparatus 100b requests the Web browser 515b to transmit the created WebRTC answer. At step S808, the Web browser 515b of the terminal apparatus 100b thereby transmits to the communication management apparatus 11 the WebRTC answer addressed to the terminal apparatus 100a through a WebSocket message to the communication management apparatus 11, for example.

At step S809, in response to receipt from the terminal apparatus 100b of the WebRTC answer addressed to the terminal apparatus 100a, the connection management unit 522 of the communication management apparatus 11 transmits the WebRTC answer to the terminal apparatus 100a through a WebSocket message thereto, for example.

At step S810, the Web browser 515a (or the second communication unit 517) of the terminal apparatus 100a determines whether the terminal apparatus 100a is capable of performing the second communication (i.e., P2P communication) with the terminal apparatus 100b with private IP addresses (e.g., the connection information CA and CB). In this case, the terminal apparatuses 100a and 100b are located in the same private network (i.e., local network). The second communication unit 517 therefore determines that the terminal apparatus 100a is capable of performing the second communication with the terminal apparatus 100b.

At steps S811 to S813, the notification unit 518 of the terminal apparatus 100a notifies the communication management terminal 11 of the determination that the terminal apparatus 100a is capable of performing the second communication with the terminal apparatus 100b through a WebSocket message to the communication management terminal 11, for example.

At step S814, the terminal apparatus 100a performs a second communication connection process 800, which is similar to the processes of steps S801 to S809, with the terminal apparatus 100c, which includes a Web app 700c and a Web browser 515c. At step S815, the Web browser 515a (or the second communication unit 517) of the terminal apparatus 100a determines whether the terminal apparatus 100a is capable of performing the second communication with the terminal apparatus 100c with private IP addresses. In this case, the terminal apparatuses 100a and 100c are located in different private networks (i.e., local networks). The second communication unit 517 therefore determines that the terminal apparatus 100a is incapable of performing the second communication with the terminal apparatus 100c.

At steps S816 to S818, the notification unit 518 of the terminal apparatus 100a notifies the communication management terminal 11 of the determination that the terminal apparatus 100a is incapable of performing the second communication with the terminal apparatus 100c through a WebSocket message the communication management terminal 11, for example.

At step S819, based on the determinations received from the terminal apparatus 100a by the receiving unit 504 at steps S813 and S818, the restriction unit 505 of the communication management apparatus 11 assesses the network connection status (i.e., network topology information). For example, the terminal apparatus 100a is capable of performing the second communication with the terminal apparatus 100b, as well as the first communication with the terminal apparatus 100b. The restriction unit 505 therefore determines that the terminal apparatus 100b is located in the same private network (or local network) as that of the terminal apparatus 100a. On the other hand, the terminal apparatus 100a is capable of performing the first communication with the terminal apparatus 100c, but is incapable of performing the second communication with the terminal apparatus 100c. The restriction unit 505 therefore determines that the terminal apparatus 100c is located in a private network (or local network) different from that of the terminal apparatus 100a.

At step S820, the restriction unit 505 of the communication management apparatus 11 transmits a bandwidth restriction command to the relay apparatus 12 to restrict the communication bandwidth for the first communication of the terminal apparatus 100b, which is determined to be located in the same private network as that of the terminal apparatus 100a.

For example, the restriction unit 505 may transmit a bandwidth restriction command to the relay apparatus 12 to instruct to reduce the communication bandwidth for the terminal apparatus 100b to transmit and receive the content data. Alternatively, the restriction unit 505 may transmit a bandwidth restriction command to the relay apparatus 12 to instruct to reduce the transmission bandwidth for the terminal apparatus 100b to transmit the content data. Thereby, the priority of the transmission bandwidth for the terminal apparatus 100a to transmit the image data is increased.

At step S821, the bandwidth management unit 523 of the relay apparatus 12 restricts the communication bandwidth for the first communication of the terminal apparatus 100b in accordance with the bandwidth restriction command from the communication management apparatus 11.

With the first communication process of FIG. 7A or 7B and the bandwidth restriction process of FIG. 8, the bandwidth control is optimized based on the network topology information in the communication system 1 of the first embodiment, in which the plurality of terminal apparatuses 100 transmit and receive the content data therebetween with the API of the Web browser.

The first communication process of FIG. 7A or 7B and the bandwidth restriction process of FIG. 8 are illustrative. For example, at step S706 in FIG. 7A, the connection request to the relay apparatus 12 transmitted from the terminal apparatus 100a to the communication management apparatus 11 includes the information of the terminal type (i.e., the transmitter terminal, the receiver terminal, or the regular terminal). This information, however, is not necessarily required. For instance, the communication management apparatus 11 may determine the terminal apparatus 100a, which has transmitted the determinations at steps S813 and S818 in FIG. 8, as the transmitter terminal. Further, based on the received determinations, the communication management apparatus 11 may determine the terminal apparatus 100b, which is capable of performing the second communication with the transmitter terminal, as the receiver terminal, and determine the terminal apparatus 100c, which is incapable of performing the second communication with the transmitter terminal, as the regular terminal.

A second embodiment of the present invention will be described.

In the terminal apparatus 100a of the first embodiment, the first communication unit 516, the second communication unit 517, and the notification unit 518 are implemented by the program executed by the Web browser 515. This implementation is illustrative, and the first communication unit 516, the second communication unit 517, and the notification unit 518 of the terminal apparatus 100a may be implemented by, for example, a mobile application as the code of part of a Web browser loaded as a library.

A functional configuration of the communication system 1 of the second embodiment will be described.

Figure 9:
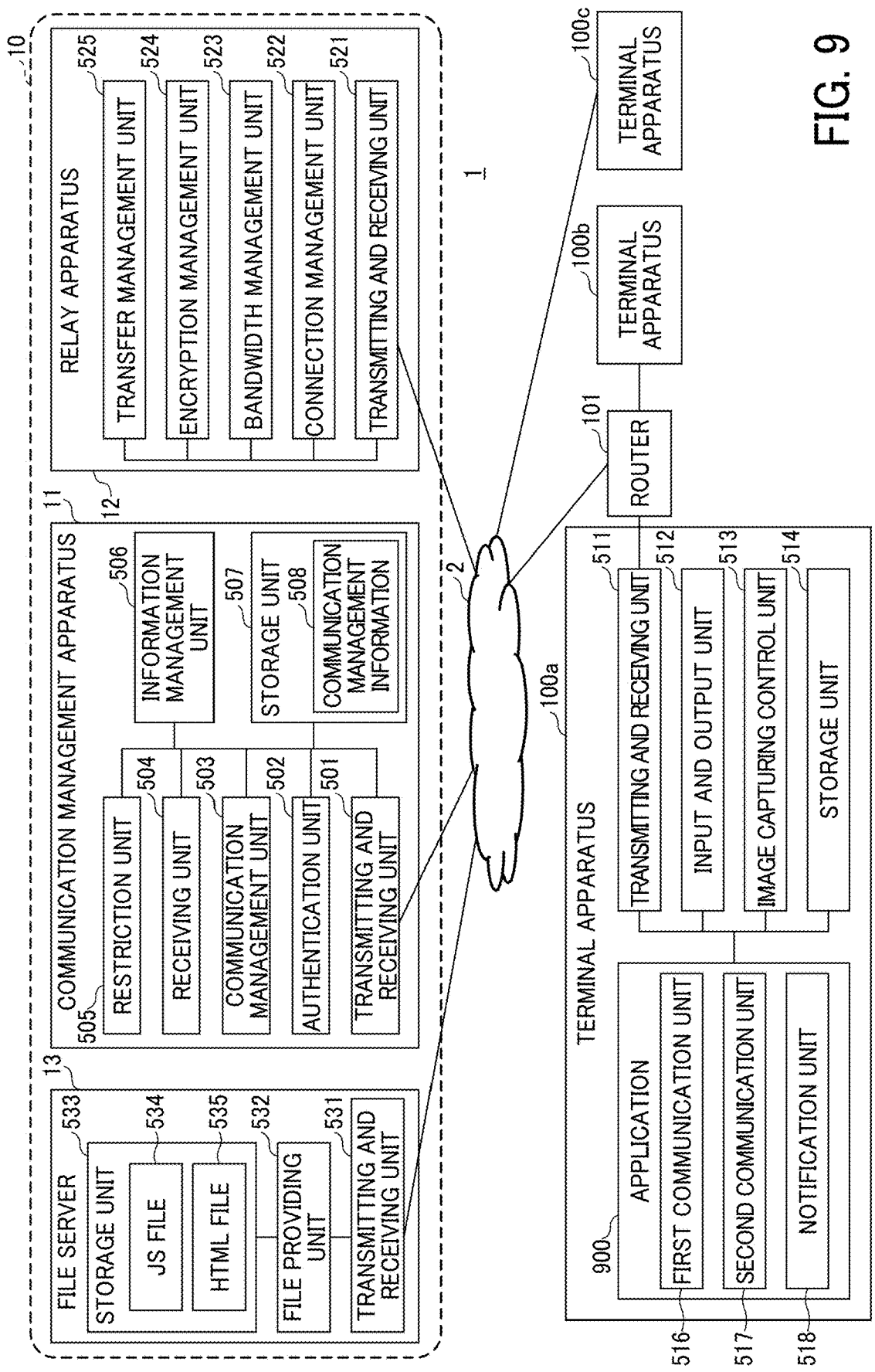
FIG. 9 is a diagram illustrating an example of the functional configuration of the communication system according to a second embodiment of the present invention.

FIG. 9 is a diagram illustrating an example of the functional configuration of the communication system 1 according to the second embodiment.

As a functional configuration of the terminal apparatus 100a of the second embodiment, the first communication unit 516, the second communication unit 517, and the notification unit 518 are implemented by the CPU 311 executing an application 900 functioning as a Web browser, in place of the Web browser 515.

The first communication unit 516 of the second embodiment performs the first communication process of performing the first communication to transmit and receive the content data to and from another terminal apparatus 100 via the relay apparatus 12. The second communication unit 517 of the second embodiment performs the second communication process of performing the second communication with another terminal apparatus 100 on a one-to-one basis. For example, the second communication unit 517 performs the second communication (i.e., P2P communication) in accordance with the ICE protocol for WebRTC. The notification unit 518 of the second embodiment performs the notification process of notifying the communication management apparatus 11 of the determination of whether the terminal apparatus 100 is capable of performing the second communication with each of the other terminal apparatuses 100 performing the first communication with the terminal apparatus 100.

The other functional units of the terminal apparatus 100a of the second embodiment may be similar to those of the terminal apparatus 100a of the first embodiment described above with FIG. 5. Further, the respective functional configurations of the terminal apparatuses 100b and 100c, the communication management apparatus 11, the relay apparatus 12, and the file server 13 of the second embodiment may be similar to those of the first embodiment.

A processing procedure of a communication management method of the second embodiment will be described.

A first communication process of the second embodiment will first be described.

Figure 10:
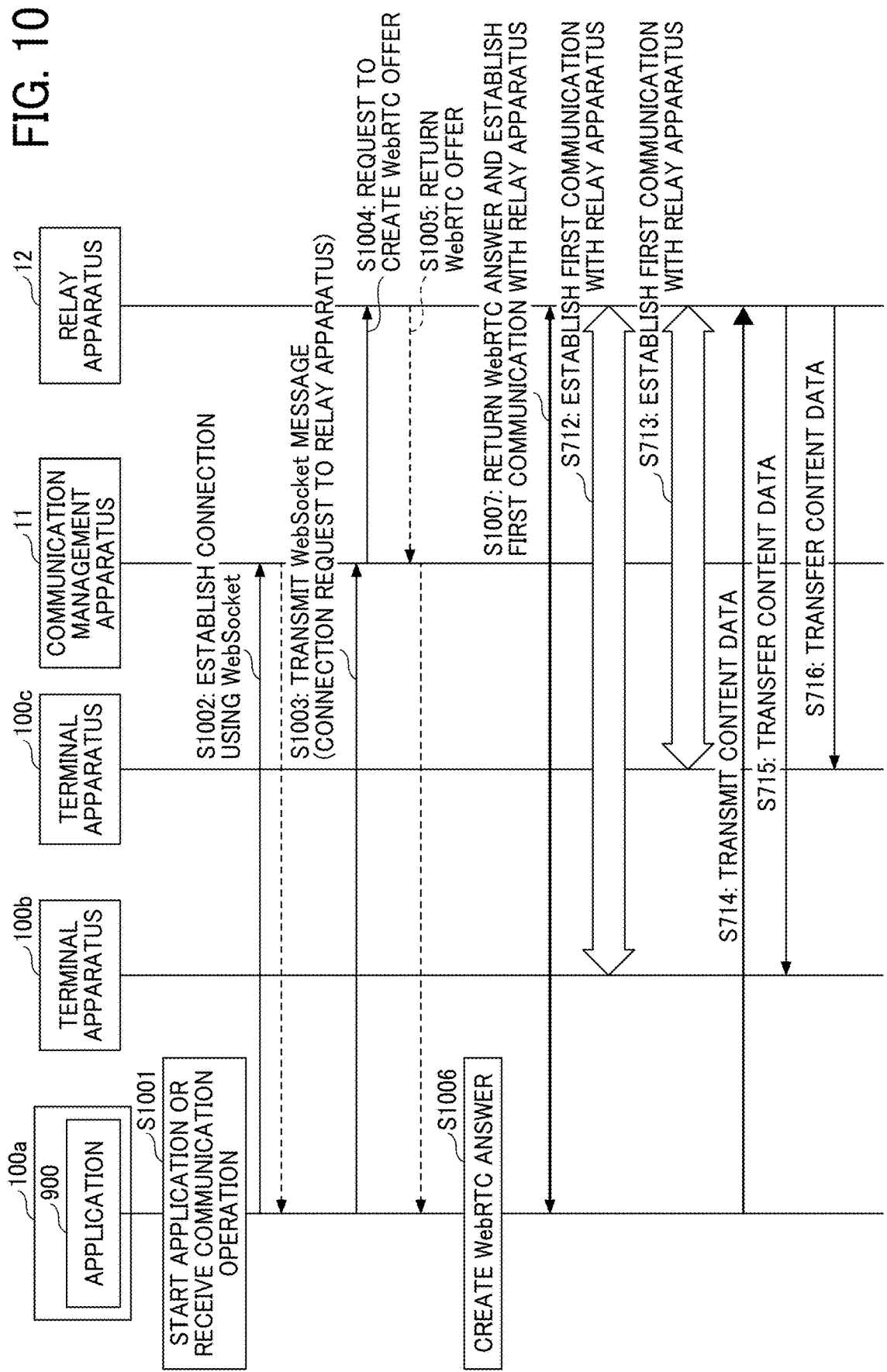
FIG. 10 is a sequence diagram illustrating an example of the first communication process of the second embodiment.

FIG. 10 is a sequence diagram illustrating an example of the first communication process of the second embodiment. In the first communication process of FIG. 10, the processes of steps S712 to S716 are similar to those of the first embodiment described above with FIG. 7A, and thus description thereof will be omitted here. The first communication process of the second embodiment is basically similar to that of the first embodiment, and thus detailed description of processes similar to those of the first embodiment will be omitted here.

At step S1001, the terminal apparatus 100a starts the application 900 or receives a communication operation, and the communication system 1 starts the processes of step S1002 and the subsequent steps.

At step S1002, the first communication unit 516 of the terminal apparatus 100a establishes the connection with the communication management apparatus 11 in accordance with the WebSocket.

At step S1003, the first communication unit 516 of the terminal apparatus 100a transmits, through a WebSocket message to the communication management apparatus 11, a connection request to the relay apparatus 12 to request to connect to the room with the room ID "Room1" of the relay apparatus 12 as the transmitter terminal.

At step S1004, in response to receipt of the valid connection request to the relay apparatus 12 from the terminal apparatus 100a, the communication management unit 503 of the communication management apparatus 11 requests the relay apparatus 12 to create a WebRTC offer.

At step S1005, the connection management unit 522 of the relay apparatus 12 returns a WebRTC offer in response to the request to create a WebRTC offer from the communication management apparatus 11.

At step S1006, in response to receipt of the WebRTC offer from the relay apparatus 12 via the communication management apparatus 11, the first communication unit 516 of the terminal apparatus 100a creates a WebRTC answer.

At step S1007, the first communication unit 516 of the terminal apparatus 100a returns the created WebRTC answer to the relay apparatus 12, to thereby establish the first communication with the relay apparatus 12. For example, the terminal apparatus 100a shares an encryption key for DTLS encryption with the relay apparatus 12, and transmits and receives the content data such as the image or audio data to and from the relay apparatus 12 by encrypting the content data with the shared encryption key.

At step S712, the terminal apparatus 100b performs the process 700 of FIG. 7A, which is similar to the process of steps S701 to S711, to establish the first communication with the relay apparatus 12. At step S713, the terminal apparatus 100c similarly performs the process 700 of FIG. 7A, which is similar to the process of steps S701 to S711, to establish the first communication with the relay apparatus 12.

As described above, the terminal apparatus 100a may execute the first communication process with the application 900 functioning as a Web browser.

In the first communication process of the second embodiment in FIG. 10, the application 900 functioning as a Web browser may create the WebRTC offer, and the relay apparatus 12 may create the WebRTC answer, similarly as in the first communication process of the first embodiment in FIG. 7B.

A bandwidth restriction process of the second embodiment will be described.

Figure 11:
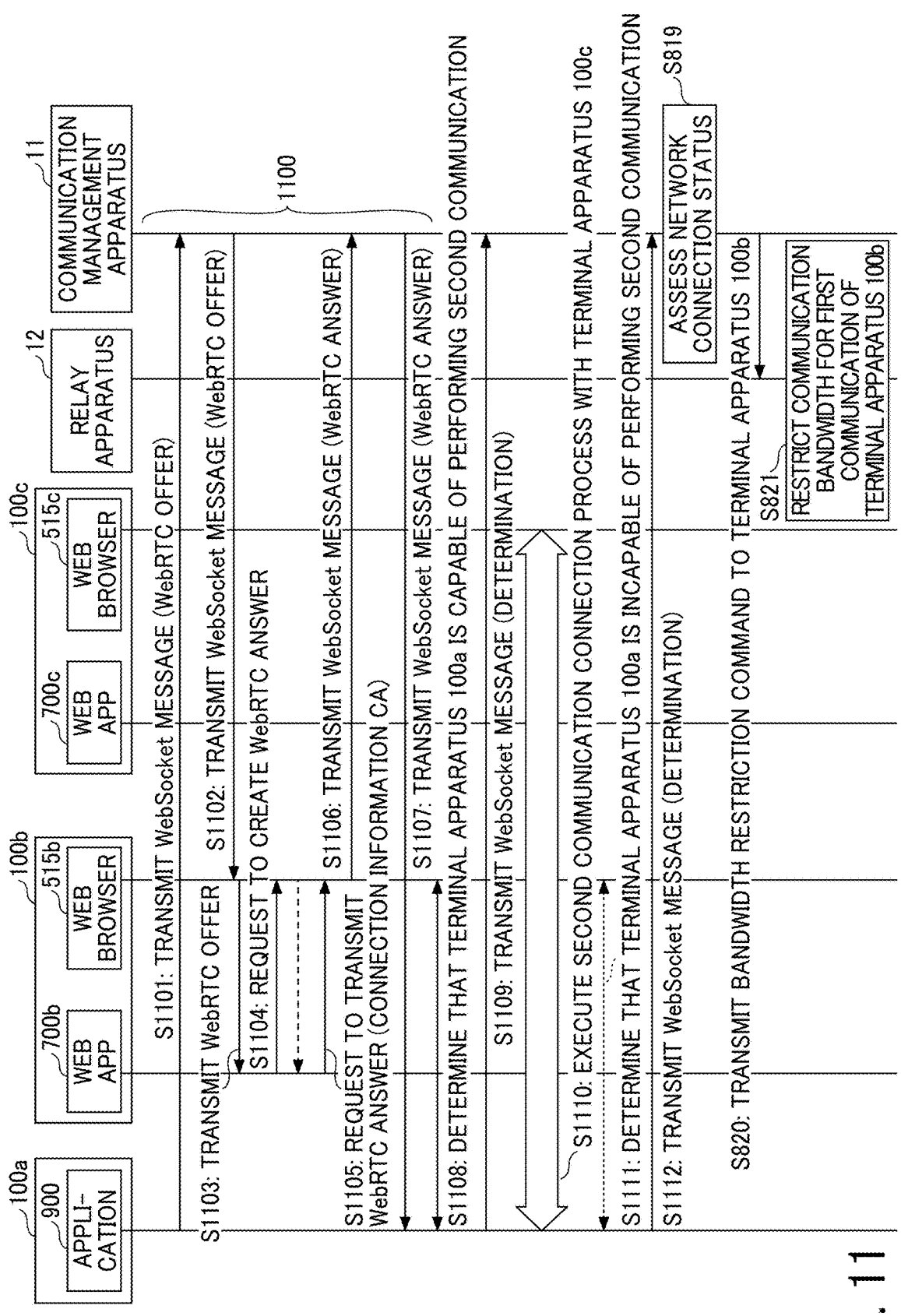
FIG. 11 is a sequence diagram illustrating an example of the bandwidth restriction process of the second embodiment.

FIG. 11 is a sequence diagram illustrating an example of the bandwidth restriction process of the second embodiment. In the bandwidth restriction process of FIG. 11, the processes of steps S819 to S821 are similar to those of the first embodiment described above with FIG. 8, and thus description thereof will be omitted here. The bandwidth restriction process of the second embodiment is basically similar to that of the first embodiment, and thus detailed description of processes similar to those of the first embodiment will be omitted here.

At step S1101, the second communication unit 517 of the terminal apparatus 100a creates a WebRTC offer addressed to the terminal apparatus 100b, and transmits the created WebRTC offer to the communication management apparatus 11 through a WebSocket message to the communication management apparatus 11, for example.

At step S1102, in response to receipt from the terminal apparatus 100a of the WebRTC offer addressed to the terminal apparatus 100b, the connection management unit 522 of the communication management apparatus 11 transmits the WebRTC offer to the terminal apparatus 100b through a WebSocket message to the terminal apparatus 100b, for example.

At step S1103, the second communication unit 517 of the terminal apparatus 100b implemented by the Web app 700b receives the WebRTC offer from the terminal apparatus 100a. At step S1104, in response to the WebRTC offer, the second communication unit 517 requests the Web browser 515b to create a WebRTC answer. The WebRTC answer includes the connection information CA of the terminal apparatus 100a, for example.

At step S1105, the second communication unit 517 of the terminal apparatus 100b requests the Web browser 515b of the terminal apparatus 100b to transmit the created WebRTC answer. At step S1106, the Web browser 515b thereby transmits to the communication management apparatus 11 the WebRTC answer addressed to the terminal apparatus 100a through a WebSocket message to the communication management apparatus 11, for example.

At step S1107, in response to receipt from the terminal apparatus 100b of the WebRTC answer addressed to the terminal apparatus 100a, the connection management unit 522 of the communication management apparatus 11 transmits the WebRTC answer to the terminal apparatus 100a through a WebSocket message thereto, for example.

At step S1108, the second communication unit 517 of the terminal apparatus 100a determines whether the terminal apparatus 100a is capable of performing the second communication (i.e., P2P communication) with the terminal apparatus 100b with private IP addresses. In this case, the terminal apparatuses 100a and 100b are located in the same private network (i.e., local network). The second communication unit 517 therefore determines that the terminal apparatus 100a is capable of performing the second communication with the terminal apparatus 100b.

At step S1109, the notification unit 518 of the terminal apparatus 100a notifies the communication management terminal 11 of the determination that the terminal apparatus 100a is capable of performing the second communication with the terminal apparatus 100b through a WebSocket message to the communication management terminal 11, for example.

At step S1110, the terminal apparatus 100a performs a second communication connection process 1100, which is similar to the processes of steps S1101 to S1107, with the terminal apparatus 100c. At step S1111, the second communication unit 517 of the terminal apparatus 100a determines whether the terminal apparatus 100a is capable of performing the second communication with the terminal apparatus 100c with private IP addresses. In this case, the terminal apparatuses 100a and 100c are located in different private networks (i.e., local networks). The second communication unit 517 therefore determines that the terminal apparatus 100a is incapable of performing the second communication with the terminal apparatus 100c.

At step S1112, the notification unit 518 of the terminal apparatus 100a notifies the communication management terminal 11 of the determination that the terminal apparatus 100a is incapable of performing the second communication with the terminal apparatus 100c through a WebSocket message to the communication management terminal 11, for example.

As described above, the processing of the Web browser 515 in the terminal apparatus 100a of the first embodiment may be implemented by a mobile application functioning as a Web browser (e.g., a WebRTC API), for example.

Also in the terminal apparatuses 100b and 100c, the processing of the Web browser 515 may be implemented by a mobile application functioning as a Web browser (e.g., a WebRTC API), for example.

According to the embodiments of the present invention, in the communication system 1, in which the plurality of terminal apparatuses 100 transmit and receive the content data therebetween with the API of the Web browser, the bandwidth control is optimized based on the network topology information.

The apparatuses described in each of the embodiments disclosed in the present specification form one of a plurality of computing environments for implementing the embodiment. In an embodiment of the present invention, the communication management apparatus 11 is a server cluster including a plurality of computing devices configured to communicate with each other via a desired type of communication link such as a network or a 5 shared memory, for example, to execute the processes disclosed in the present specification. The components of the communication management apparatus 11 may be integrated in a single computer 400, or may be distributed to a plurality of computers 400.

In the communication system 1 illustrated in FIG. 5, the processes of the communication system 1 illustrated in FIG. 7A or 7B and FIGS. 8, 10, and 11, for example, may be shared in various combinations. For instance, the processes performed by the communication management apparatus 11 may be at least partially performed by the relay apparatus 12 or the file server 13 or by an external server or cloud service, for example.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A communication management apparatus comprising circuitry configured to:
manage first communication in which a first terminal apparatus transmits first content data to a second terminal apparatus via a relay apparatus,
manage second communication in which the first terminal apparatus transmits second content data to a third terminal apparatus via the relay apparatus,
receive, from the first terminal apparatus, a determination of whether the first terminal apparatus is communicable with at least one of the second terminal apparatus or the third terminal apparatus through third communication that bypasses the relay apparatus, and
based on a determination that the first terminal apparatus is communicable with the second terminal apparatus through the third communication, determine that the first terminal apparatus and the second terminal apparatus are on a same network and cause restriction of a communication bandwidth for the first communication of the second terminal apparatus determined to be communicable with the first terminal apparatus through the third communication,
wherein a communication bandwidth for the second communication is not restricted based on a determination that the first terminal apparatus is not communicable with the third terminal apparatus via the third communication.

2. The communication management apparatus of claim 1, wherein the circuitry instructs the relay apparatus to restrict the communication bandwidth for the first communication of the second terminal apparatus determined to be communicable with the first terminal apparatus through the third communication.

3. The communication management apparatus of claim 2, wherein the circuitry causes restriction of a transmission bandwidth for the first communication of the second terminal apparatus determined to be communicable with the first terminal apparatus through the third communication.

4. The communication management apparatus of claim 1, wherein the third communication is peer-to-peer communication in which the first terminal apparatus exchanges data with the second terminal apparatus on a one-to-one basis.

5. The communication management apparatus of claim 4, wherein the first terminal apparatus and the second terminal apparatus use private IP addresses to perform the peer-to-peer communication.

6. The communication management apparatus of claim 1, wherein the first terminal apparatus is an image capturing device that transmits a captured image to the second terminal apparatus.

7. The communication management apparatus of claim 1, wherein the same network is a private network.

8. The communication management apparatus of claim 1, wherein the first terminal apparatus is determined not to be communicable with the third terminal apparatus when the first terminal apparatus and the third terminal apparatus are on different networks.

9. The communication management apparatus of claim 1, wherein the circuitry is configured to cause restriction of the communication bandwidth of the first communication of the second terminal apparatus by causing restriction of transmission and reception bandwidths of the first communication of the second terminal apparatus.

10. A communication system comprising:
the communication management apparatus of claim 1; and
the first terminal apparatus including terminal circuitry configured to perform the first communication of transmitting the first content data to the second terminal apparatus via the relay apparatus,
transmit, to the communication management apparatus, the determination of whether the first terminal apparatus is communicable with at least one of the second terminal apparatus or the third terminal apparatus through second communication that bypasses the relay apparatus, and perform the third communication with the second terminal apparatus.

11. The communication system of claim 10, wherein the first terminal apparatus and the second terminal apparatus perform the first communication or the third communication with a Web browser or an application behaving as a Web browser.

12. The communication system of claim 11, wherein the terminal circuitry performs the third communication with an application programming interface for Web real-time communication.

13. The communication system of claim 10, wherein the third communication is peer-to-peer communication in which the first terminal apparatus exchanges data with the second terminal apparatus on a one-to-one basis.

14. The communication system of claim 13, wherein the first terminal apparatus and the second terminal apparatus use private IP addresses to perform the peer-to-peer communication.

15. The communication system of claim 10, wherein the first terminal apparatus is an image capturing device that transmits a captured image to the second terminal apparatus.

16. A communication management method comprising:
managing first communication in which a first terminal apparatus transmits first content data to a second terminal apparatus via a relay apparatus;
managing second communication in which the first terminal apparatus transmits second content data to a third terminal apparatus via the relay apparatus,
receiving, from the first terminal apparatus, a determination of whether the first terminal apparatus is communicable with at least one of the second terminal apparatus or the third another terminal apparatus through third communication that bypasses the relay apparatus; and
based on a determination that the first terminal apparatus is communicable with the second terminal apparatus through the third communication, determining that the first terminal apparatus and the second terminal apparatus are on a same network and causing restriction of a communication bandwidth for the first communication of the second terminal apparatus determined to be communicable with the first terminal apparatus through the third communication,
wherein a communication bandwidth for the second communication is not restricted based on a determination that the first terminal apparatus is not communicable with the third terminal apparatus via the third communication.

17. A non-transitory recording medium which, when executed by one or more processors, causes the processors to perform a communication management method, the method comprising:
managing first communication in which a first terminal apparatus transmits first content data to a second terminal apparatus via a relay apparatus;
managing second communication in which the first terminal apparatus transmits second content to a third terminal apparatus via the relay apparatus;
receiving, from the first terminal apparatus, a determination of whether the first terminal apparatus is communicable with at least one of the second terminal apparatus or the third terminal apparatus through third communication that bypasses the relay apparatus; and
based on a determination that the first terminal apparatus is communicable with the second terminal apparatus through the third communication, determining that the first terminal apparatus and the second terminal apparatus are on a same network and causing restriction of a communication bandwidth for the first communication of the second terminal apparatus determined to be communicable with the first terminal apparatus through the third communication,
wherein a communication bandwidth for the second communication is not restricted based on a determination that the first terminal apparatus is not communicable with the third terminal apparatus via the third communication.

* * * * *